(12) United States Patent
DeSantis et al.

(10) Patent No.: US 8,249,904 B1
(45) Date of Patent: Aug. 21, 2012

(54) MANAGING USE OF PROGRAM EXECUTION CAPACITY

(75) Inventors: Peter N. DeSantis, Seattle, WA (US); Matthew S. Garman, Seattle, WA (US); Charles L. Ward, Sammamish, WA (US); James Alfred Gordon Greenfield, Cape Town (ZA); Andrew R. Jassy, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 830 days.

(21) Appl. No.: 12/334,022

(22) Filed: Dec. 12, 2008

(51) Int. Cl.
 *G06Q 10/00* (2012.01)
 *G06F 15/16* (2006.01)
 *H04J 3/16* (2006.01)
(52) U.S. Cl. ................. 705/7.12; 709/201; 370/465
(58) Field of Classification Search .............. None
 See application file for complete search history.

(56) References Cited

U.S. PATENT DOCUMENTS

| | | | |
|---|---|---|---|
| 5,325,496 A | 6/1994 | Hays et al. | |
| 5,388,233 A | 2/1995 | Hays et al. | |
| 5,572,700 A | 11/1996 | Hays et al. | |
| 5,640,533 A | 6/1997 | Hays et al. | |
| 5,640,569 A * | 6/1997 | Miller et al. | 710/241 |
| 5,640,582 A | 6/1997 | Hays et al. | |
| 6,356,989 B1 | 3/2002 | Hays et al. | |
| 6,912,229 B1 * | 6/2005 | Lauro et al. | 370/465 |
| 6,993,504 B1 | 1/2006 | Friesen et al. | |
| 7,243,121 B2 | 7/2007 | Neiman et al. | |
| 7,246,093 B1 | 7/2007 | Katz | |
| 7,251,629 B1 | 7/2007 | Marynowski et al. | |
| 7,609,574 B2 | 10/2009 | Hays | |
| 7,609,575 B2 | 10/2009 | Hays | |
| 2002/0038279 A1 | 3/2002 | Samuelson et al. | |
| 2002/0091653 A1 | 7/2002 | Peevey | |
| 2003/0026208 A1 * | 2/2003 | Bijwaard et al. | 370/236 |
| 2005/0021438 A1 | 1/2005 | Tezuka et al. | |
| 2005/0120160 A1 | 6/2005 | Plouffe et al. | |
| 2006/0005181 A1 | 1/2006 | Fellenstein et al. | |
| 2006/0069621 A1 | 3/2006 | Chang et al. | |
| 2006/0155555 A1 | 7/2006 | Barsness et al. | |

(Continued)

OTHER PUBLICATIONS

"What is Google App Engine?", retrieved Jul. 31, 2008, from http://code.google.com/appengine/docs/whatisgoogleappengine.htm, 4 pages.

(Continued)

*Primary Examiner* — Ryan Zeender
*Assistant Examiner* — Denisse Ortiz Roman
(74) *Attorney, Agent, or Firm* — Seed IP Law Group PLLC

(57) ABSTRACT

Techniques are described for managing execution of programs. In some situations, program execution is managed for multiple users using excess program execution capacity of one or more computing systems. In some such situations, excess or otherwise unused program execution capacity may be made available to execute programs on a temporary basis, such that the programs executing using the excess program execution capacity may be terminated at any time if other preferred use for the excess program execution capacity arises. The excess program execution capacity may in some situations be provided in conjunction with other dedicated program execution capacity that is allocated to particular users, such as to use unused dedicated capacity of some users as excess capacity for other users. In some situations, the techniques are used in conjunction with a fee-based program execution service that executes multiple programs on behalf of multiple users of the service.

31 Claims, 6 Drawing Sheets

U.S. PATENT DOCUMENTS

| | | | |
|---|---|---|---|
| 2006/0179106 A1* | 8/2006 | Turner et al. | 709/201 |
| 2006/0190605 A1 | 8/2006 | Franz et al. | |
| 2006/0195508 A1 | 8/2006 | Bernardin et al. | |
| 2006/0265371 A1 | 11/2006 | Edmond et al. | |
| 2008/0005327 A1 | 1/2008 | Hays | |
| 2008/0034057 A1* | 2/2008 | Kumar et al. | 709/217 |
| 2010/0088205 A1 | 4/2010 | Robertson | |

OTHER PUBLICATIONS

On-Demand Enterprise: Sun to be Part of First Online Compute Exchange, Feb. 14, 2005, retrieved Aug. 18, 2008, from http://www.printthis.clickability.com/pt/cpt?action=cpt&title=On-Demand+Enterprise%3A+Sun+..., 2 pages.

What is Google App Engine?—Google App Engine, retrieved Dec. 16, 2008, from http://code.google.com/appengine/docs/whatisgoogleappengine.html, 4 pages.

Jelling, J., "Your PC can Contribute with Google Compute," Sep. 29, 2004, retrieved Jul. 26, 2008, from http://www.webpronews.com/topnews/2004/09/29/your-pc-can-contribute-with-google-co..., 2 pages.

McDonald, P., Google App Engine Blog, "Announcing Open Signups, Expected Pricing, and two new APIs," May 28, 2008, retrieved Jul. 26, 2008, from http://googleappengine.blogspot.com/2008/05/announcing-open-signups-expected,html, 2 pages.

* cited by examiner

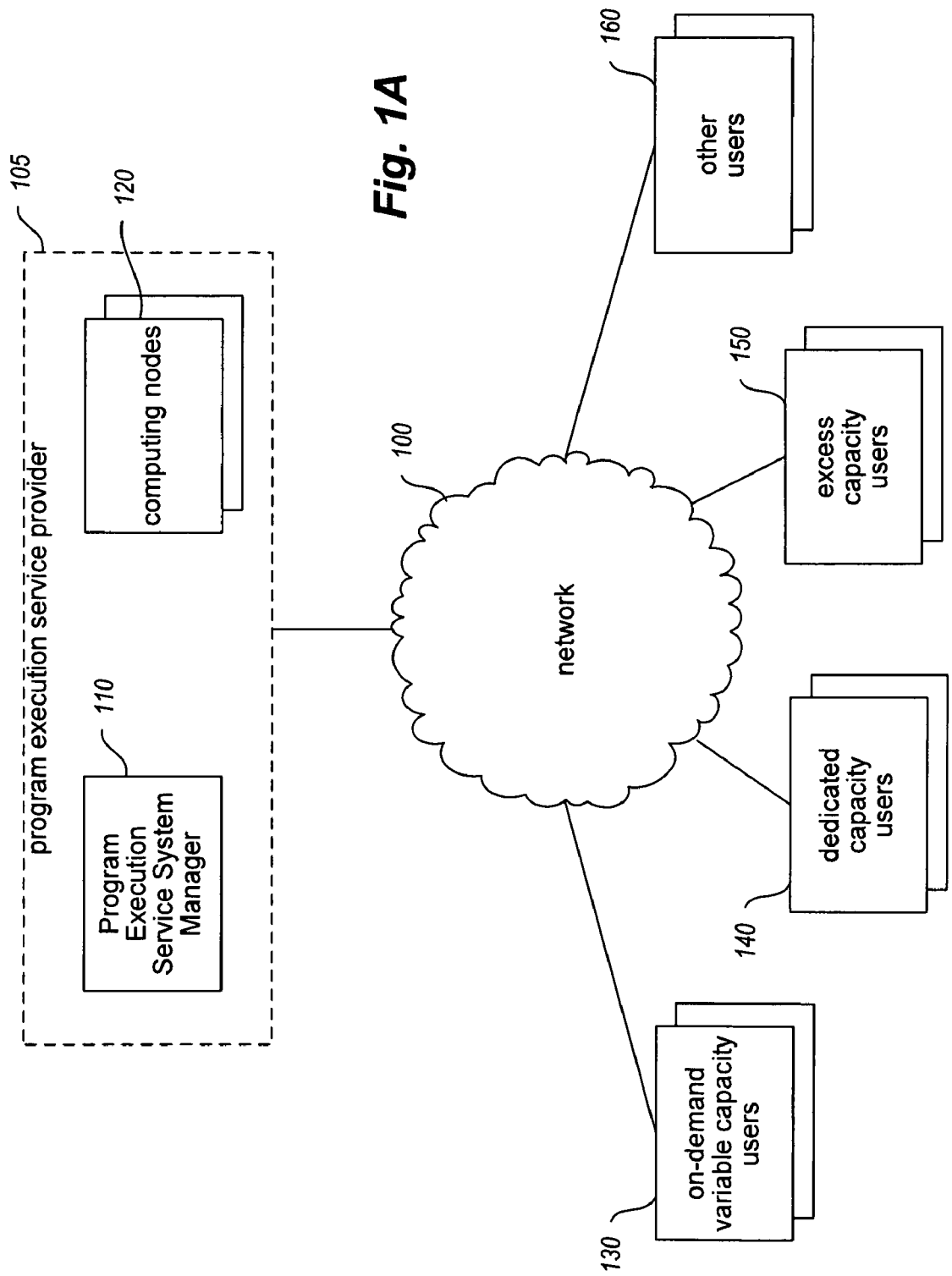

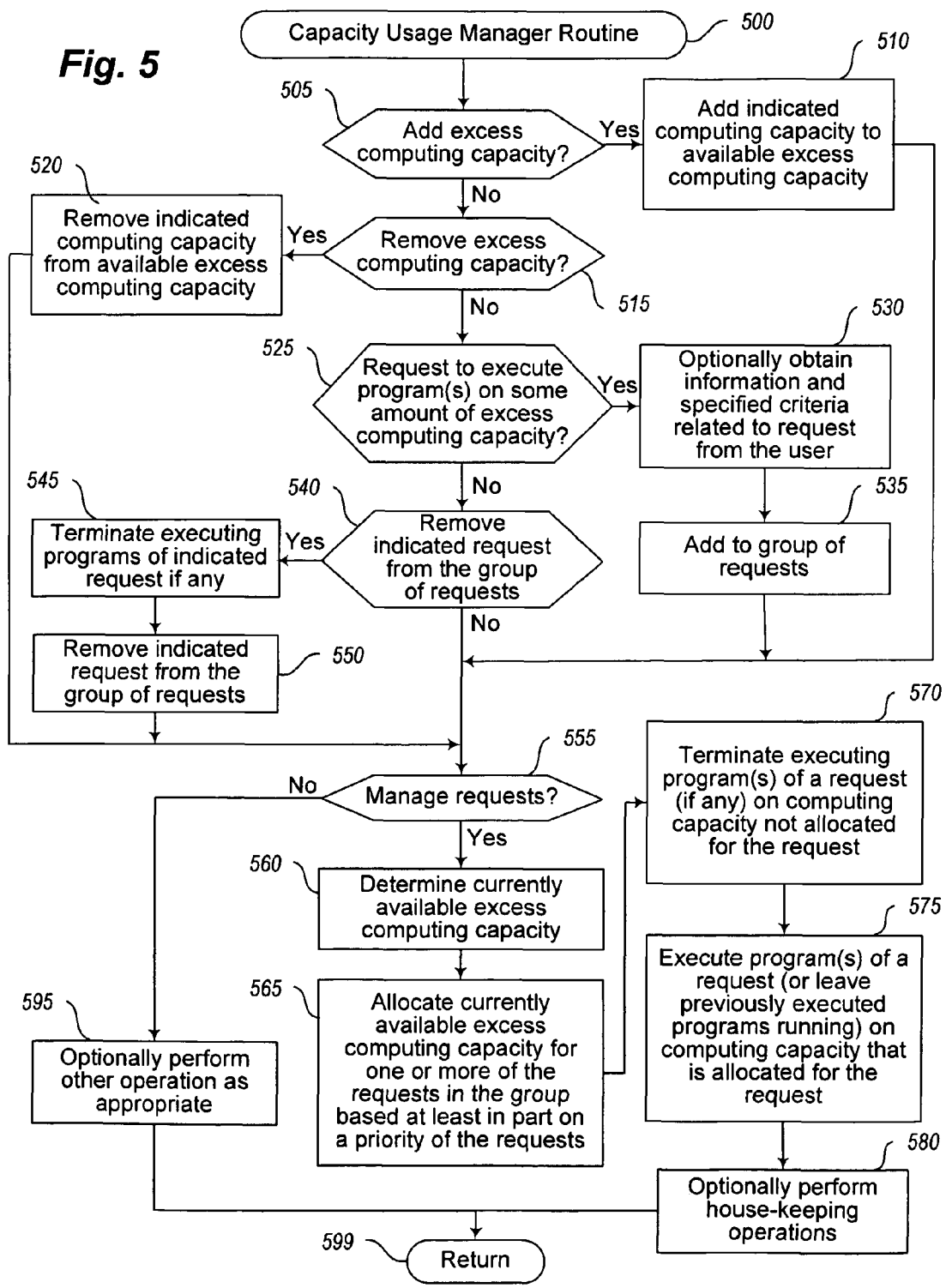

US 8,249,904 B1

MANAGING USE OF PROGRAM EXECUTION CAPACITY

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided some benefits with respect to managing large-scale computing resources for many customers with diverse needs, allowing various computing resources to be efficiently and securely shared by multiple customers. For example, virtualization technologies such as those provided by VMWare, XEN, or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

BRIEF DESCRIPTION OF THE DRAWINGS

FIGS. 1A and 1B are network diagrams illustrating example embodiments of interactions to manage use of program execution capacity available to multiple users of a program execution service.

FIG. 5 illustrates a flow diagram of an example embodiment of a Capacity Usage Manager routine.

DETAILED DESCRIPTION

Figure 1B:
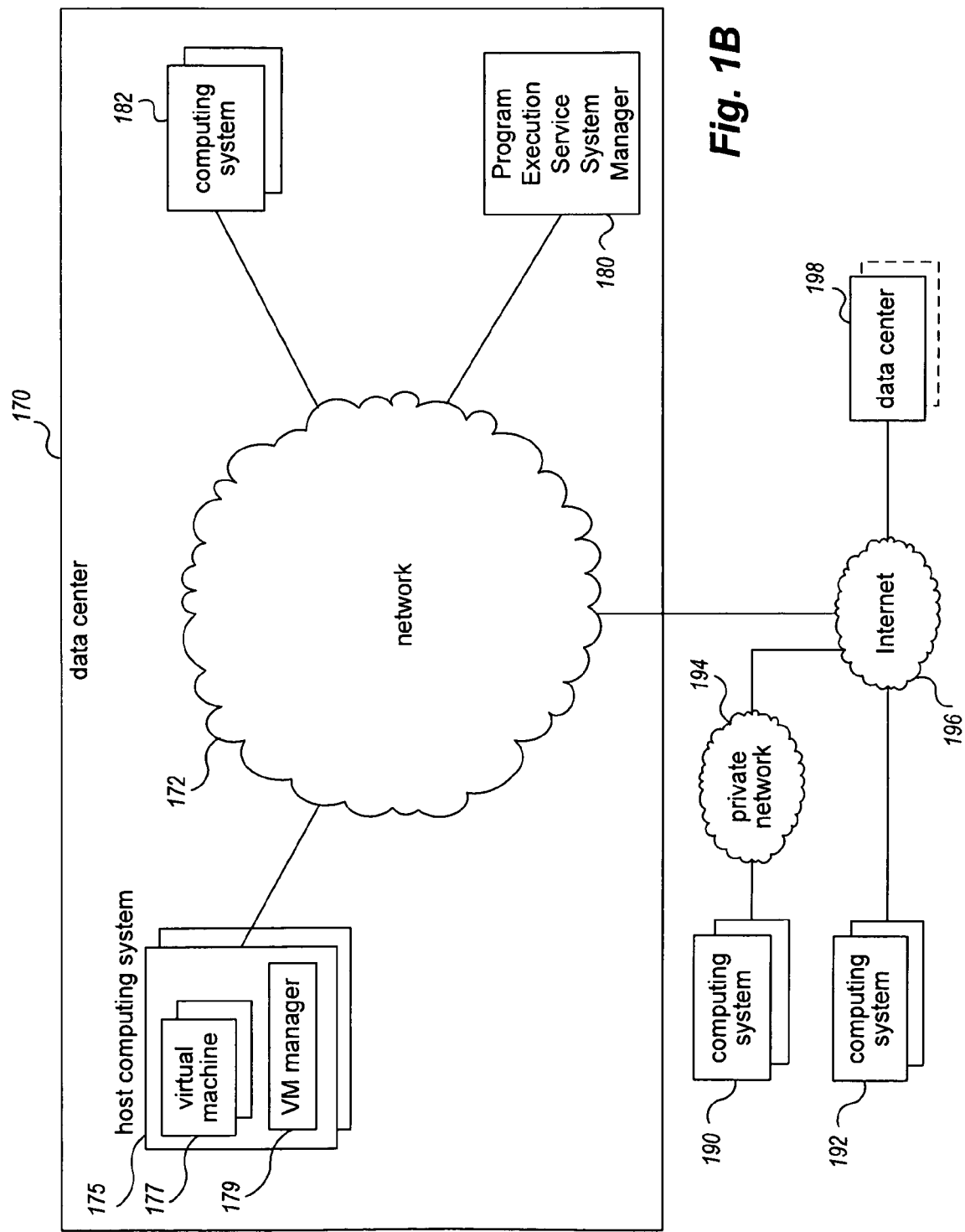

Techniques are described for managing execution of programs. In at least some embodiments, the execution of programs is managed for multiple users using excess program execution capacity or other excess computing capacity of one or more computing systems. In addition, in at least some embodiments, the techniques may be used in conjunction with a program execution service ("PES") that executes multiple programs on behalf of multiple customers or other users of the service, such as a program execution service that provides multiple computing nodes (e.g., multiple physical computing systems and/or virtual machines that are hosted on one or more physical computing systems) for executing user programs. In at least some embodiments, some or all of the techniques may be automatically performed by embodiments of a Program Execution Service System Manager module, as described in greater detail below.

In some embodiments, excess or otherwise unused program execution capacity of a PES or other group of computing nodes may be made available to execute programs on behalf of users on a temporary or non-guaranteed basis, such that the excess program execution capacity may be available to execute such programs until a time that the program execution capacity is desired for other purposes (e.g., for preferential or reserved use by one or more other users). In some cases, one or more programs may be executing on behalf of a user using excess program execution capacity at the time that the excess program execution capacity is desired for other purposes, and, in some such cases, the execution of the programs may be automatically terminated (e.g., shut down, aborted, etc.) by the PES so as to be available for the other purposes. In at least some such embodiments, programs that are automatically terminated may be automatically restarted on behalf of the user at a future time, such as a future time when a sufficient amount of excess program execution capacity again becomes available to execute the programs for the user. Additional details related to using excess program execution capacity are included below.

In some embodiments, at least some of the program execution capacity available from a PES for executing programs may be allocated to one or more users for preferential use by those users, such that each of those users has priority access relative to other users to use a respective amount of the program execution capacity. In one such embodiment, the priority access of the users may be based on each of the users having dedicated or exclusive access to use the respective amount of program execution capacity (e.g., each user having one or more dedicated computing nodes and/or portions thereof that are allocated for reserved or guaranteed use by the user in executing programs). For example, in at least some such embodiments, a respective amount of program execution capacity of a PES may be allocated to a particular user for dedicated access over a specified period of time, such as in a manner analogous to a lease of one or more physical computing systems so that the respective amount of program execution capacity may be available for executing programs on behalf of the user throughout the specified period of time. In addition, in some embodiments, a user may be given preferential or other dedicated access to execute programs based on one or more factors, such as fees paid by the user, an agreement to a contractual obligation for using the dedicated access for a period of time and/or subject to other conditions, etc.

In at least some embodiments, at least some of the program execution capacity that is allocated to one or more users for dedicated or other preferential use may be used as excess program execution capacity during some times, such as when the allocated capacity is not being used for a preferential use and/or when the user to whom the capacity is allocated makes the allocated capacity available for use by other users. In this manner, at least some program execution capacity that is allocated to a first group of users may become available from time to time to temporarily execute programs on behalf of other users. When the demand for excess program execution capacity from multiple users is greater than the currently available supply, particular users and programs may be selected to use the excess program execution capacity in various ways. For example, in some embodiments, a user who requests excess program execution capacity to execute a program may be given priority over other such users based on one or more factors, such as fees offered and/or paid by the user, a time that a request to use the excess program execution capacity is submitted, a time at which or by which excess program execution capacity use is requested to start, an amount of time or a deadline by which excess program execution capacity use is requested to be completed, a type and/or amount of excess program execution capacity requested (e.g., a specified quantity of computing nodes), etc. Additional details related to the use of dedicated program execution capacity as excess program execution capacity are included below.

In addition, in some embodiments, a PES may further include on-demand variable program execution capacity that is available to satisfy dynamically received requests of users to execute programs (e.g., immediately upon request of those users, at an indicated future time, at some time during an indicated future time period, etc.), such that the one or more programs indicated by such a request may be executed if computing resources sufficient to satisfy the requested execution are available at (or near) the requested time, but without such a request being guaranteed to be satisfied. For example, after a variable program execution capacity request is received to dynamically execute one or more programs on behalf of a user (e.g., for immediate execution), the one or more programs may be executed for the user if an appropriate amount of program execution capacity is currently available for executing those programs (e.g., if it is determined that there is a sufficient number of available computing nodes with resources to satisfy the request), and otherwise the request may be denied (or in some cases, postponed). Thus, in some such embodiments, such a request for variable program execution capacity may be unsuccessful, such as if the appropriate amount of program execution capacity is not available to execute the one or more programs at the time of the requested execution (e.g., if it is determined that there are not enough currently available computing nodes with sufficient resources to satisfy a request for immediate execution).

In some embodiments, the computing nodes used to provide the on-demand variable program execution capacity may be distinct from the computing nodes used to provide dedicated program execution capacity and/or from the computing nodes used to provide excess program execution capacity—thus, if some of the computing nodes used to provide the on-demand variable program execution capacity are not in use, in some embodiments they may be used to provide excess program execution capacity until on-demand variable program execution capacity requests are received, while in other embodiments they may not be used to provide excess program execution capacity. In addition, in some embodiments, after a variable program execution capacity request for immediate (or scheduled) execution is satisfied and successfully initiates execution of one or more programs on behalf of a respective user, the ongoing use of the variable program execution capacity may be guaranteed to continue until some future time, such as a time of the respective user's choosing (e.g., based on an indication received from the respective user to terminate use of and/or release the program execution capacity) and/or a time based upon design by the user (e.g., the one or more programs executing on behalf of the user automatically terminate the execution, such as upon completion of a task or otherwise; an application and/or other user interacting with the one or more programs executing on behalf of the respective user terminates the execution, such as if the one or more programs executing for the respective user are provided for interactive use of others; etc.). Alternatively, in some embodiments, the guaranteed ongoing use of the variable program execution capacity may be subject to certain limitations, such as to be guaranteed that the PES will not preempt the use for other purposes, but not to be guaranteed against failure of the computing nodes executing the programs.

In addition, as previously noted, in at least some embodiments dedicated program execution capacity functionality of a PES may be available for one or more users, such that each of the one or more users may have some dedicated amount of program execution capacity that is allocated by the PES and guaranteed to be available for executing programs on behalf of the one or more users (e.g., a dedicated number of one or more computing nodes provided by the PES, a dedicated portion of the computing resources provided by one or more of the computing nodes of the PES, etc.). For example, the guaranteed availability of the dedicated program execution capacity may be provided in conjunction with one or more QoS ("Quality Of Service") criteria, such as that the dedicated program execution capacity will be available within a specified period of time after a request to initiate execution of an indicated program (e.g., a period of time that corresponds to terminating execution of other programs using excess computing capacity and to initiating execution of the indicated program). In contrast the variable program execution capacity functionality and excess program execution capacity functionality, a user of dedicated-capacity functionality may always have some specified amount of program execution capacity available for executing programs on behalf of the user during a specified use period, barring unforeseen and/or occasional events rendering services of the PES unavailable (e.g., service failure, maintenance, cancellation, etc).

FIG. 1A is a network diagram that illustrates an example of managing use of multiple types of program execution capacity to execute programs for multiple users. For illustrative purposes, some examples and embodiments are described below in which specific types of program execution capability are provided and managed in specific manners. These examples are provided for illustrative purposes and are simplified for the sake of brevity, and it will be appreciated that the inventive techniques may be used in a wide variety of other situations, only some of which are described below.

In the example of FIG. 1A, a number of users are interacting over a network 100 with an illustrated embodiment of a Program Execution Service System Manager ("PESSM") module 110 to execute programs on one or more computing nodes 120 available for executing programs of the users, such as a PESSM module 110 that provides some or all of the functionality of a particular program execution service (not shown). The network 100 may, for example, be a publicly accessible network of linked networks, possibly operated by various distinct parties, such as the Internet. In other embodiments, the network 100 may be a private network, such as, for example, a corporate or university network that is wholly or partially inaccessible to non-privileged users. In still other embodiments, the network 100 may include one or more private networks with access to and/or from the Internet. In the illustrated embodiment, the PESSM module 110 and the computing nodes 120 are provided by a program execution service provider 105 as part of a program execution service, and the PESSM module 110 may execute on one or more computing systems (not shown).

In some embodiments, the illustrated computing nodes 120 are provided for executing programs on behalf of the users, and may include multiple physical computing systems and/or multiple virtual machines that are hosted on one or more physical computing systems (as is described in more detail with respect to FIG. 1B). Each of the computing nodes 120 has some amount of computing resources available for executing one or more programs, such as to provide a specific amount of program execution capacity, such as may be measured, for example, by a combination of one or more of processing capacity (e.g., number and/or size of processing units), memory capacity, storage capacity, network bandwidth capacity, etc. In some embodiments, the PES provider 105 may provide preconfigured computing nodes, with each preconfigured computing node having similar and/or equivalent amounts of resources available for executing programs on behalf of users, while in other embodiments, the PES provider 105 may provide a selection of various different computing nodes from which a user may choose for executing programs on behalf of the user, such as each selection having varying amounts and/or types of computing resources (e.g., size, speed and/or type of processing units; number of processing units; amount of memory and/or storage; platform configuration, such as 32-bit or 64-bit; etc.).

In this illustrated embodiment, the program execution service provides a variety of functionality for managing execution of programs for multiple users on the computing nodes 120. In particular, various users 130, 140, 150 and 160 may interact with the PESSM 110 to configure and/or request various types of execution of programs on behalf of the users, as discussed below. In some embodiments, the various users may interact with the PESSM 110 to specify preferred and/or required resources for execution of programs on behalf of the users (e.g., by specifying one or more computing nodes, etc.). In various embodiments, such resources may be specified at the time of a request for execution of programs on behalf of a user and/or at one or more other times, such as when a user registers and/or subscribes to use services of a program execution service. In some embodiments, the PESSM 110 may provide subscription and/or registration services to one or more users, such that users may specify information related to one or more programs to execute on behalf of a user (e.g., programs, source code, addressable locations of one or more programs, etc.), account information (e.g., user name, billing information, etc.), terms of use, etc. In some embodiments, after a user interacts with the PESSM 110 to subscribe and/or register for services, the user may be issued one or more identifiers (e.g., keys, tokens, user names, etc.) that are associated with the user and are to be used in conjunction with executing programs on behalf of the user. In other embodiments, a module other than the PESSM 110 may be provided to perform various operations related to subscription and/or registration services of a PES.

In the illustrated embodiment, one or more variable capacity users 130 are interacting with the PESSM 110 to configure and/or request execution of one or more programs using on-demand variable program execution capacity, such as by submitting a request for immediate execution and/or providing information for later execution. After a request for immediate execution is received, the PESSM 110 may determine whether there are a sufficient number of computing nodes 120 with available resources for satisfying the request, and if so, the PESSM 110 may initiate execution of one or more programs for the request on an appropriate amount of the computing nodes on behalf of the user. In cases where a user schedules a request for one or more future executions of one or more programs, the PESSM 110 may attempt to reserve an appropriate amount of computing nodes for executing the one or more programs at the one or more future times, and/or may delay the determination of which computing nodes to use for execution until a later time (e.g., such as when the one or more future times occur). In the illustrated embodiment, if the PESSM 110 is unable to allocate computing nodes for executing a variable capacity user request, the request may fail, such that the programs are not executed. In such cases, the user 130 may resubmit a failed request for later execution. As previously noted, in some embodiments, a variable capacity user may be charged various fees in association with use of the PES, such as based on a number of computing nodes used, a type of computing nodes used, a duration of time the computing nodes are used, etc.

In addition, in the illustrated embodiment, some amount of the computing nodes 120 has been allocated for use by one or more of the dedicated capacity users 140, such that each of the one or more dedicated capacity users 140 may have priority access to execute programs for the user on at least some portion of the allocated computing nodes. For example, in some embodiments, each of the dedicated capacity users 140 may have one or more computing nodes 120 dedicated for executing programs of that user during a specified use time period, such that the user may access the one or more computing nodes at any time during the specified use period to execute programs on behalf of the user and/or may continuously execute programs on the one or more computing nodes for the duration of the specified period. As one specific example, one or more of the dedicated capacity users 140 may enter into a long-term (e.g., 1 year term) agreement with the PES provider 105, such that each of those users has priority access to a dedicated amount of the computing nodes 120 over the term of the agreement in exchange for a fixed fee payment (e.g., upfront or periodically billed) and, in some cases, other use fees (e.g., variable fees associated with use of various resources, such as electricity, physical rack space, network utilization, etc.).

After a dedicated capacity user 140 interacts with the PESSM 110 to request priority use of a dedicated amount of computing nodes, the PESSM 110 may allocate one or more computing nodes from the computing nodes 120 for dedicated use by the user. For example, in some embodiments, one or more specific computing nodes of the multiple computing nodes 120 (e.g., one or more specific physical computing nodes and/or virtual computing nodes) may be allocated for priority use by an associated specific dedicated capacity user for an entire use period (e.g., such as by allocating the specific computing nodes at the time of registration, and/or at one or more other times), such that requests to execute programs on behalf of the specific dedicated user on dedicated computing nodes during the use period results in initiation of execution of the programs on the specific one or more allocated computing nodes. In other embodiments, rather than allocate specific computing nodes to specific dedicated users 140 for an entire use period, the PESSM 110 may instead allocate computing nodes from a dedicated computing node pool with multiple computing nodes, such that an appropriate amount of computing nodes with sufficient resources to satisfy requests for execution by the various dedicated capacity users 140 may be available in the dedicated computing node pool. In some such embodiments, after a request is received to execute one or more programs for a dedicated user 140 on one or more dedicated computing nodes, an appropriate amount of computing nodes 120 sufficient to execute the programs may be selected from the dedicated computing node pool at the time of the request to execute the one or more programs. After the selected amount of computing nodes are no longer used for executing the request (e.g., after termination and/or completion of the requested execution), those computing nodes may be returned to the dedicated computing node pool for use by other dedicated capacity users. In some embodiments, after a use period for a particular dedicated capacity user 140 expires, the one or more computing nodes allocated for use by that user may similarly be released for use by others, such as by, for example, making the computing nodes available to be allocated for use by one or more other (e.g., new) dedicated capacity users. In addition, the PESSM 110 may perform one or more various other management operations with respect to fulfilling requests for execution, such as, for example, enforcing use periods and/or other restrictions associated with requests and/or users submitting requests, freeing-up computing resources to fulfill the requests, authorizing and/or authenticating the requests and/or the requesting users, etc. In some embodiments, a delay may be incurred between a time that a request for execution on dedicated program execution capacity and a time that the request is fulfilled, such as a delay period for performing various of the management operations, etc. In various other embodiments, computing nodes for dedicated capacity users may be allocated, tracked, reserved and/or released using various other techniques.

In addition, in the illustrated embodiment, multiple excess capacity users 150 are interacting with the PESSM 110 to configure and/or request execution of one or more programs using excess program execution capacity of the PES. As previously noted, excess program execution capacity may include excess and/or unused program execution capacity that may be otherwise allocated for other uses. For example, in the illustrated embodiment, excess program execution capacity may include a number of the computing nodes 120 that are otherwise allocated for other purposes (e.g., for use by dedicated capacity users 140, variable capacity users 130, and/or other users 160), but are not currently being used for those purposes. The excess capacity users may configure requests for execution of programs in various ways in various embodiments, such as by specifying a number and/or type of computing nodes for execution of programs, a minimum and/or maximum number of computing nodes to use, an expiration time for the request, a preferred execution time and/or period of execution, one or more bids for payment of use of excess program execution capacity (e.g., a bid per each use of a computing node, a bid per use of one or more computing nodes per some unit of time, a minimum and/or maximum bid, etc), etc.

Figure 2:
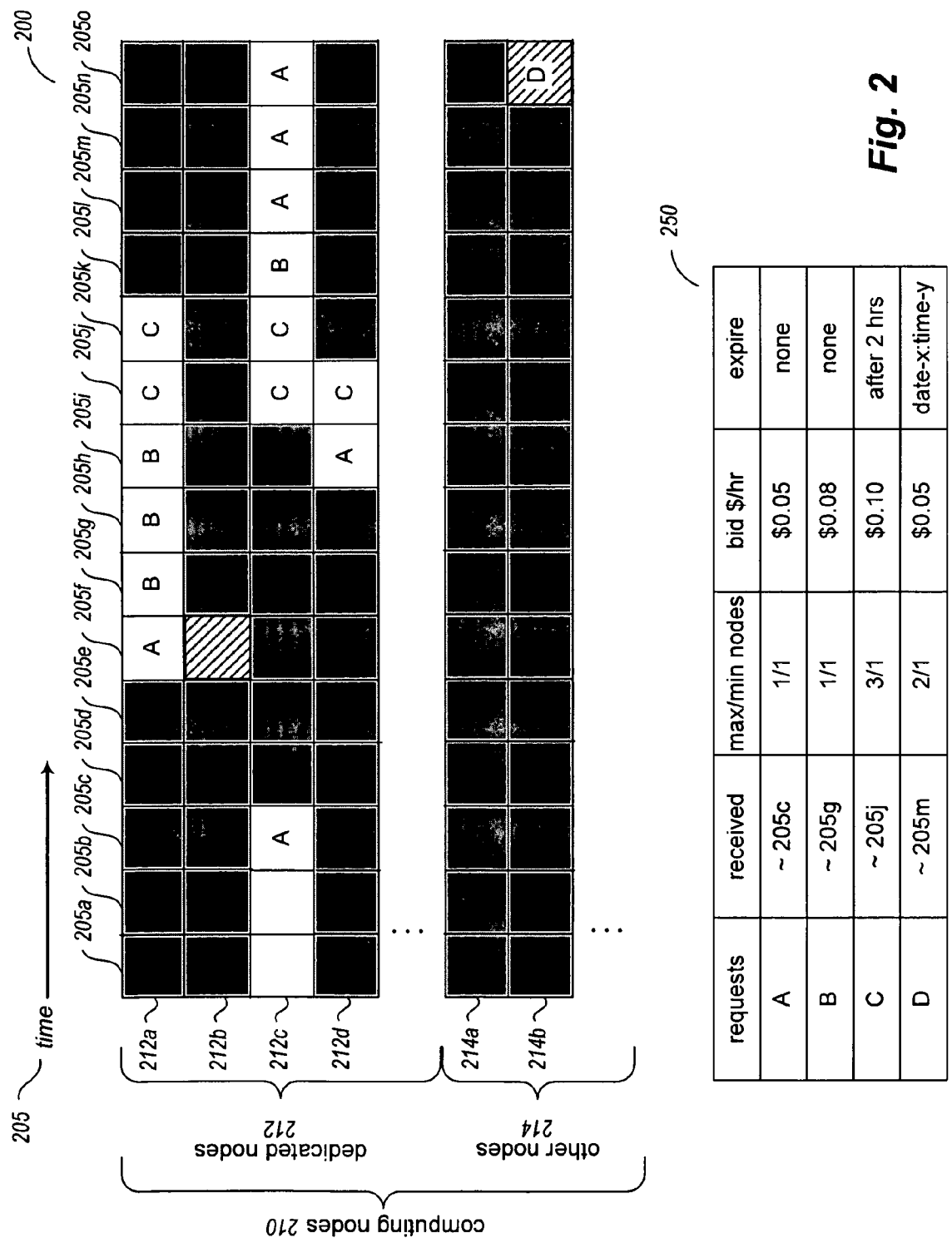
FIG. 2 illustrates an example embodiment of techniques for managing use of program execution capacity of multiple computing nodes.

As is further discussed with respect to FIG. 2, the illustrated embodiment of the PESSM 110 may determine when to include and/or remove one or more computing nodes 120 from excess program execution capacity that is available for use by excess capacity users 150, as well as determine when to initiate and/or terminate requested execution of programs for excess capacity users 150, and determine on which of the computing nodes 120 available for use by excess capacity users to execute the programs. In various embodiments, the PESSM 110 may determine that one or more computing nodes are unused and/or or otherwise available for use by excess capacity users 150 in various ways. For example, in some embodiments, the PESSM 110 may receive indications from various users and/or entities that one or more computing nodes are not being used or are otherwise available for use by excess capacity users, such as indications from one or more dedicated capacity 140 users that they are not using some number and/or portion of the computing nodes dedicated for use by those users. In some such embodiments, such dedicated capacity users may indicate one or more times at which dedicated computing nodes are likely to be or are committed by the dedicated capacity users to be unused and/or available (e.g., particular times of day, particular days, periods of time, etc.). In addition, in some embodiments, one or more other users 160 may interact in similar manners to indicate that one or more computing nodes, such as one or more computing nodes under the control of the one or more other users 160 (e.g., third party computing systems, not shown), are available for use by excess capacity users.

In other embodiments, the PESSM 110 may automatically determine when computing nodes are available for excess capacity users, such as, for example, by monitoring some or all computing nodes 120 to determine when the computing nodes are not being used and/or by tracking usage patterns of one or more users of such computing nodes (e.g., dedicated capacity users 140, variable capacity users 130, other users 160, etc.). In some such cases, determining whether computing nodes are unused or otherwise underutilized may include determining and/or predicting a likelihood that the computing nodes will remain unused for at least a period of time sufficient to execute programs of one or more excess capacity users, such as, for example, based on an analysis of past use patterns of the computing nodes by one or more users. In various embodiments, a period of time sufficient to execute programs of one or more excess capacity users may be based on one or more considerations, such as a time to stop/start programs on behalf of users, a time to configure computing nodes for use, a type of program executed on behalf excess capacity users (e.g., some types of programs may perform useful amounts of work in short periods of time, such as various types of data processing, etc., while other programs use longer periods of time), etc.

After it is determined that one or more computing nodes 120 are available for use by one or more excess capacity users 150, such computing nodes may be added to a pool of available excess program execution capacity and/or otherwise tracked, such that the one or more computing nodes may be used by the PESSM 110 for executing programs on behalf of one or more excess capacity users 150 until such time that other use of the computing nodes arises (e.g., such as priority usage by dedicated capacity users 140, variable computing users 130, and/or one or more other users or entities 160). The PESSM 110 may further determine that one or more of the excess capacity computing nodes are no longer available for use by excess capacity users 150 in various ways in various embodiments. For example, in some embodiments, the PESSM 110 may receive indications that one or more computing nodes are no longer available, such as based on explicit requests to stop use of the computing nodes from a user 160 that controls those computing nodes, requests to execute programs of priority users on the one or more computing nodes, an expiration of a specified period of availability, etc. As another example, in some embodiments, the PESSM 110 may automatically determine other uses for the computing nodes, such as, for example, based on received requests from one or more users that correspond to the other uses, or based on determining a likely demand for one or more computing nodes 120 (e.g., based on detecting an increased usage of other resources and/or programs for which the computing nodes may be used, etc.).

In some embodiments, an excess capacity user 150 may interact with the PESSM 110 to request immediate execution of one or more programs on a specified number of excess computing nodes and/or to schedule such execution at one or more future times, such that the PESSM 110 may initiate the requested execution on the specified number of excess computing nodes if it is determined that the specified number of excess computing nodes are available at the time of the requested execution. In addition, in some embodiments, an excess capacity user 150 may interact with the PESSM 110 to configure a request for execution of one or more programs on a specified number of excess computing nodes to be performed as the specified number of excess computing nodes with sufficient resources becomes available to execute the one or more programs, such as during an indicated future period of time, and in some such embodiments the PESSM 110 may initiate the requested execution on the specified number of excess computing nodes when it determines that the specified number of excess computing nodes are available during that period of time. In some embodiments, an excess capacity user 150 may specify a minimum and/or maximum number of excess computing nodes to use for performing a requested execution, such that the requested execution is initiated if the PESSM 110 determines that at least the minimum number of excess computing nodes are available, and the PESSM 110 may initiate the requested execution on up to the maximum (if specified) number of excess computing nodes for the request based on availability of the excess computing nodes.

After a request for execution of one or more programs on behalf of an excess capacity user 150 is received, if the PESSM 110 determines that there are an appropriate number of computing nodes with sufficient computing resources to satisfy the requested execution, the PESSM may select which of the available computing nodes to use for the requested execution in various ways. For example, in some embodiments, the PESSM may simply select an appropriate number of excess computing nodes from any of the available computing nodes with sufficient resources, such as, for example, by randomly selecting from a pool of available computing nodes. In other embodiments, one or more specific computing nodes may be selected on the basis of one or more other factors, such as, for example, a predicted length of and/or likelihood of continued availability of the one or more specific computing nodes, a physical proximity of the one or more specific computing nodes to one or more other computing nodes, a geographic location of the one or more specific computing nodes and/or one or more other computing nodes, etc.

As previously noted, execution of programs for excess capacity users on excess computing nodes may be temporary, such that the PESSM 110 may automatically terminate such programs when other preferred uses for the excess computing nodes arise (e.g., such as if the excess computing nodes are reclaimed by a dedicated capacity user 140 who previously was not using a decided computing node, etc.). In such cases, if programs are currently executing on behalf of excess capacity users 150 on any of those excess computing nodes, then those programs may be automatically terminated (e.g., aborted, shut down, hibernated, etc.), such that the computing nodes are free for other purposes and no longer available for excess capacity users. In addition, as discussed in greater detail elsewhere, in some embodiments the execution state of those programs may be saved before they are terminated, such as to enable a later restart of the program. Furthermore, in some such embodiments, there may be multiple excess computing nodes currently executing programs on behalf of excess capacity users 150 that may be capable of satisfying the number of computing nodes for the other purposes, and in such cases, the PESSM 110 may determine which of the excess computing nodes to free for the other purposes based on various factors (e.g., by using a determined priority among the current requests of the excess capacity users, such as based on time submitted, bid prices, etc.). In some embodiments, at least some of the terminated programs may have their execution be migrated and/or reinitiated on one or more other available excess computing nodes (if any), such as immediately or at a later time. In some such cases, if there are not enough excess computing nodes available to satisfy all of the current excess capacity users 150 who are executing programs (or requesting execution of programs), then the PESSM 110 may determine to terminate one or more additional programs executing on one or more other excess computing nodes such that the one or more programs initially terminated that were executing on the specific computing nodes may be reinitiated on the newly freed excess computing nodes (e.g., such as based on a determined priority of the excess capacity users such that the requests associated with the one or more initially terminated programs that were executing on the specific computing nodes have higher priority than at least some of the requests associated with the one or more additional programs). In some embodiments, after the PESSM 110 automatically terminates a program of a user, the PESSM 110 may automatically reinitiate the execution of the programs as excess computing nodes become available to execute the programs for the user. In addition, in other embodiments, at least some terminated programs of a user may be automatically migrated and/or reinitiated on one or more other computing systems and/or program execution services with sufficient computing resources available to execute the programs, including one or more computing nodes available via variable capacity functionality provided to variable capacity users 130, dedicated capacity functionality provided to dedicated capacity users 140, and/or one or more third-party computing systems (not shown) external to the PES.

In addition, various types of programs may be better suited for executing in such a temporary execution environment, such as programs that are relatively tolerant of unexpected interruptions due to occasional termination. In some embodiments, excess capacity users may execute one or more programs on the excess program execution capacity that are designed to intermittently track and/or save progress (e.g., intermediate results, current runtime state, etc.), so that the programs may be reinitiated at a future time to resume activities. In addition, in some embodiments, when the PESSM 110 automatically terminates programs executing on excess computing nodes, the PESSM 110 may automatically detect the current system and/or program execution state, such that the detected state may be saved and/or provided to a respective excess capacity user 150, so that later execution of the programs may be resumed in a state similar to when the programs were automatically terminated. Alternatively, if a particular executing program is able to save its own execution state, the PESSM 110 may instead notify the program to perform its own execution state save before terminating the program. Additional details related to example embodiments of saving program execution state are included in U.S. patent application Ser. No. 12/334,004, filed concurrently and entitled "Saving Program Execution State," which is hereby incorporated by reference in its entirety.

In at least some embodiments, access to excess computing nodes for executing programs on behalf of multiple excess capacity users 150 may be based on priority among the excess capacity users 150, such that if there is contention for some amount of the excess computing nodes between two or more requests to execute programs, the request having a higher associated priority will be provided access to use the contended amount of excess computing nodes for executing programs. In at least one illustrative embodiment, requests with the highest bid amounts (e.g., a highest maximum bid) may be given priority over requests with lower bids, with ties between bid amounts being resolved based on other factors (e.g., which request was received earlier). In some embodiments, one or more of the excess capacity users 150 may interact with an embodiment of the PESSM 110 to bid (e.g., auction-style) on access to one or more available excess computing nodes (e.g., currently available and/or available at one or more future times), such that the user with the winning bid may receive the access to the one or more available excess computing nodes. In some embodiments, the PESSM 110 may automatically terminate execution of programs associated with lower priority requests that are currently executing on one or more of the excess computing nodes in favor of executing programs of higher priority requests on the one or more excess computing nodes. In some other embodiments, such as non-priority based embodiments, the PESSM 110 may instead occasionally rotate through pending requests to execute programs on excess computing nodes, such that each request may be provided some amount of execution time on one or more of the excess computing nodes.

In some embodiments, the PESSM 110 may provide interactive feedback to one or more of the excess capacity users 150 that are interacting with the PESSM 110 to configure and/or request execution of programs on some amount of excess computing nodes. For example, in some such embodiments, interactive feedback may include indications of when and/or for how long requested programs may be likely to execute on the indicated amount of excess computing nodes, such as based on current and/or predicted demand, current and/or likely amounts of excess computing nodes, one or more bid-levels, etc. In one illustrative embodiment, the PESSM 110 may indicate suggested bid levels along with corresponding information indicating when requested execution will likely occur and/or complete, such that the excess capacity user 150 may reconfigure (e.g., by specifying a different bid, a different amount and/or type of computing nodes, a different duration of execution, etc.) a request to meet the desires of the excess capacity user, such that the request may be performed at an earlier time, etc.

As previously noted, one or more of the excess capacity users 150 may be charged various fees in conjunction with use of excess program execution capacity, such as based on computing nodes used and/or one or more use factors (e.g., number of times used, amount of shared resources consumed, amount of time computing nodes are used, etc.), and/or based on one or more bids from the one or more excess capacity users 150 for use of the computing nodes. In some embodiments, a portion of the fees charged to the one or more excess capacity users 150 may be supplied to one or more other users who provided computing nodes for use by excess capacity users (e.g., one or more dedicated capacity users 140, one or more other users 160, etc.). For example, in some embodiments, such other users may be paid a proportional share of some amount of the fees that are collected from excess capacity users, such as a proportional share reflective of the amount of computing nodes contributed by the other users over time. In some cases, such fees supplied to the other users may be automatically credited and/or paid to the other users by the PES provider, such as to offset other charges incurred by those other users, such as charges incurred by dedicated capacity users.

In addition, in some embodiments, the PESSM 110 may provide an electronic marketplace (not shown) to one or more dedicated capacity users 140, such that the one or more dedicated capacity users 140 may transfer access to their dedicated computing nodes to one or more other users 160 during the use time period of the dedicated capacity, while in other embodiments a dedicated capacity user 140 and an other user 160 may arrange an exchange in a manner external to the PES. In some embodiments, a user 160 may provide payment to a dedicated capacity user in exchange for access to a transferred portion of the dedicated capacity user's dedicated computing nodes, such that the purchasing user may access the transferred portions of dedicated program execution capacity to execute programs on behalf of the purchasing user. A price for the exchanged access may be determined in various manners in various embodiments, such as via a fixed price specified by the dedicated capacity user, a price that is bid or suggested by the user 160, etc. In some embodiments, an exchange for dedicated computing nodes may be made such that the exchange is temporary and/or permanent. For example, in some embodiments, an exchange may be made for a specified limited period of time and/or various intervals of time, such that the purchasing user may access the computing nodes during that specified time and/or during the various intervals, after which the dedicated computing nodes may revert back to the dedicated capacity user for use by the dedicated capacity user. In other embodiments, the exchange may be permanent, such that the purchasing user may be provided with access to the dedicated computing nodes for any remaining use period associated with the dedicated computing nodes. In some embodiments, as part of the initial allocation of one or more computing nodes for dedicated use by a subscribing dedicated capacity user 140, the PESSM 110 may assign one or more user tokens to the subscribing user and/or may otherwise associate the allocated computing nodes with the subscribing dedicated capacity user's account, such that the dedicated capacity user's use of the computing nodes may be tracked for various purposes (e.g., configuration, authorization, billing, etc.)—in such embodiments, when a dedicated capacity user transfers a portion of their dedicated computing nodes to a new user, any provided tokens may be transferred to the new user and/or the portion of computing nodes may be otherwise associated with an account of the new user. In some embodiments, a provider of the PESSM 110 may further collect a fee in conjunction with a transfer of a portion of dedicated computing nodes from one user to another.

Although the foregoing example embodiment of FIG. 1A is described with respect to a PES that provides various types of functionality for various types of users, such as variable capacity users, dedicated capacity users and excess capacity users, it will be appreciated that various other embodiments may exist, such as embodiments with or without one or more of the various types of users. For example, it will be appreciated that some embodiments may exist where a program execution service provides functionality for excess capacity users, but does not include variable and/or dedicated capacity users, such as where the excess program execution capacity is provided by one or more third-parties and/or affiliate entities associated with the PES, such as to allow such parties and/or entities to monetize otherwise unused computing resources. In addition, some of the techniques may be used in conjunction with a bid-based PES that allows users to submit requests for and/or to schedule execution of programs on a temporary basis on all of the program execution capacity provided by the service, such that requests with higher priority at the time of execution are executed. In addition, it will be appreciated that the various users 130, 140, 150 and 160 may each act as one or more of the other various users at times, such as when those users are accessing associated functionality of the types corresponding to those other various users. For example, in some embodiments, a particular user who acts as a dedicated capacity user to execute programs on dedicated program execution capacity may also act as a variable capacity user, such as when the particular user desires additional computing resources to execute one or more programs for the respective user, etc.

In addition, in at least some additional embodiments, unused portions of a single one of the computing nodes 120 (e.g., unused processing unit clock cycles, unused portions of memory, etc.) may be made available for use by one or more excess capacity users 150, such that one or more programs of the one or more excess capacity users may be sharing resources of a single computing node with a dedicated capacity user 140 and/or other excess capacity users 150. In addition, in some embodiments, at least some of the computing nodes that are allocated for use by dedicated capacity users 140 may be made available for use by one or more variable capacity users 130, such as if it is determined that such access is unlikely to impact dedicated capacity users (e.g., in cases where accurate predictions of upcoming demand can be forecast, etc.). Furthermore, in some embodiments, if some amount of computing nodes dedicated for use by one or more dedicated capacity users 140 is oversubscribed (e.g., oversold, and/or provided to one or more other long term users), such that the oversubscribed computing nodes are unavailable for the one or more dedicated capacity users 140 at a time that those users request use of them, then one or more of the programs executing on the oversubscribed computing nodes may be migrated to one or more other computing nodes, such as one or more other computing nodes available in one or more remote data centers and/or other computing systems available for executing the one or more programs, such as computing systems provided by another program execution service, etc.

In addition, although some embodiments are described with respect to a program execution service and program execution capacity, it will be appreciated that the described techniques may be used to manage access to various other groups of computing nodes or other types of computing-related resources. A non-exclusive list of examples of other types of computing-related resources that may be managed for use by multiple users may include the following: persistent data storage capabilities (e.g., on non-volatile memory devices, such as hard disk drives); temporary data storage capabilities (e.g., on volatile memory, such as RAM); message queuing and/or passing capabilities; other types of communication capabilities (e.g., network sockets, virtual communication circuits, etc.); database management capabilities; dedicated bandwidth or other network-related resources; input device capabilities; output device capabilities; CPU cycles or other instruction execution capabilities; etc.

FIG. 1B illustrates an embodiment in which a program execution service may be provided using one or more data centers that include multiple physical computing systems. In particular, FIG. 1B is a network diagram illustrating an example embodiment in which a PESSM module 180 of a program execution service manages execution of one or more programs on behalf of users. The illustrated example includes a data center 170 used by the PES that is connected to the Internet 196 external to the data center 170. In this example, the Internet 196 provides access to various external computing systems, such as computing systems 190 via private network 194 and computing systems 192. The private network 194 may be, for example, a corporate network that is wholly or partially inaccessible from non-privileged computing systems external to the private network 194. Computing systems 192 may include, for example, a home computing system that connects directly to the Internet (e.g., via a telephone or cable modem, a Digital Subscriber Line ("DSL"), etc.). In addition, one or more other data centers 198 are illustrated that are connected to data center 170 via the Internet 196, such as may further be used by the PES in at least some embodiments.

The example data center 170 includes a number of physical host computing systems 175, physical computing systems 182, and a PESSM module 180 of the PES. In this example, host computing systems 175 each provide multiple virtual machines 177 and have a virtual machine ("VM") manager component 179 to manage those virtual machines (e.g., a hypervisor or other virtual machine monitor), and some or all of the computing systems 182 may similarly have one or more such virtual machines and/or VM Manager components (not shown). Alternatively, in other embodiments, some or all of the physical host computing systems at the data center may not provide any virtual machines, such as to instead directly execute one or more programs on behalf of end user customers of the PES. Furthermore, in some embodiments various of the computing systems 175 and 182 may have differing capabilities, may have different associated fees for use, may support different types of user programs (e.g., virtual machine software image instances of different sizes, or programs with different types of resource criteria and/or computing resource usage, such as differing patterns of I/O and memory access and network usage), etc. If so, particular users and/or their programs may be grouped (e.g., automatically) according to one or more such factors, which may further be used as constraints and/or preferences regarding which computing systems to select for executing particular programs. The data center further includes an internal network 172 that may include multiple networking devices (not shown), such as switches, edge routers, and core routers, with computing systems 175 and 182 and the PESSM module 180 connected to the internal network 172.

The illustrated PESSM module 180 performs at least some of the described techniques in order to manage execution of programs using the computing systems 175 and 182, as described in greater detail elsewhere. When a particular computing node or system is selected to execute one or more programs of a user, the PESSM module may in some embodiments initiate execution of those programs by interacting with a VM manager component or other manager component that controls execution of programs for that selected computing node/system, or may alternatively directly execute the programs on the selected computing node/system. Users of the PES may use various computing systems to interact with the PESSM module 180, such as computing systems 190 or 192, or computing systems at one of the other data centers 198.

It will be appreciated that the data center of FIG. 1B is provided for illustrative purposes only, and that program execution services and other software execution services may be provided in other manners in other embodiments. For example, PESSM module 180 may instead be provided using one or more other computing systems external to the data center 170, such as computing systems 190, 192 or at a data center 198.

FIG. 2 illustrates an example of techniques for managing use of excess computing nodes, such as that may be automatically performed by an embodiment of a PESSM module. In particular, table 200 illustrates information about usage of a number of computing nodes 210 of a program execution service by various users of the program execution service over time 205, with use of each computing node 210 being illustrated at consecutive time intervals 205a-205o. In addition, table 250 illustrates information about example requests A, B, C and D received by the program execution service to execute programs on behalf of users using excess computing nodes of the program execution service. In the illustrated table 200, a time interval having a solid gray background (e.g., time interval 205*a* of dedicated computing node 212*b* and time interval 205*h* of other computing node 214*a*) indicates that the respective computing node is not available to be used for excess program execution capacity during that respective interval of time (e.g., it is being used for one or more other purposes and/or is otherwise not available); a time interval having a solid white background (e.g., time intervals 205*b* and 205*c* of dedicated computing node 212*c*) or having a diagonal-lined background (e.g., time interval 205*f* of dedicated computing node 212*b* and time interval 205*o* of other computing node 214*b*) indicates that the respective computing node is available for use as excess program execution capacity during that respective interval of time; and a time interval containing a letter A, B, C or D (e.g., time intervals 205*f*-205*k* of dedicated computing node 212*a*) indicates that programs of the respective request for excess program execution capacity are executing on the respective computing node during that time interval.

As previously noted, table 250 illustrates various requests received by the program execution service at various indicated times, such that each of the various requests is to execute one or more programs on a specified amount of excess computing nodes available from the program execution service using computing nodes 210. In addition, each of the requests has various specified configuration information in this example, including a specified minimum and maximum number of computing nodes on which to execute the one or more programs of the request; a bid fee amount that the user is willing to pay for execution of the one or more programs on each of the computing nodes (e.g., such as a dollar amount per use hour of a single computing node); and an indication of a time at which the request is to expire (e.g., such as a specified total duration of execution time after which a request is to expire, a specified time at which a request is to expire, etc.). As one illustrative example, request A was received at a time that approximately corresponds to time interval 205*c* (e.g., just before time interval 205*c* or during time interval 205*c*), with a minimum and maximum number of computing nodes both indicating a preference to execute on a single excess capacity computing node, with a bid price of $0.05 per hour of use of the single excess computing node, and with no specified expiration (e.g., indicating that the request is to continuously execute and/or re-execute until the program execution is completed). In other embodiments, the various requests may be configured in other ways, such as to include one or more of a specified particular type of computing node to use (e.g., and/or characteristics of such computing nodes), a minimum and/or maximum bid amount, and/or one or more other configurations (e.g., fault tolerance requirements, execution locality and/or proximity preferences, etc.). In addition, other types of information may be indicated in some embodiments, such as one or more particular programs to be executed for each request.

The illustrated table 200 includes a number of dedicated capacity computing nodes 212, such as computing nodes that have been allocated for dedicated access to one or more specific dedicated capacity users of the program execution service. For example, a dedicated capacity user (not shown) may have priority access to the specific computing node 212*a* for a specified period of time (e.g., a year), such that the user may access computing node 212*a* to execute programs on behalf of the user at any time during the specified period of time, although such access may be subject to a delay period and/or one or more interactions on the part of the user to gain access (e.g., notifications of an intent to use the computing node 212*a* at a particular time, a request to execute programs on computing node 212*a*, etc.). In other embodiments, the dedicated capacity user (not shown) may instead have priority access to a computing node with equivalent computing resources as computing node 212*a* (e.g., equivalent processing capacity, memory, etc.), but not have a particular allocated computing node 212, such that the user may be provided access to any of the computing nodes 212 that are equivalent to 212*a* for executing programs on behalf of the user and that are available for use. In various such embodiments, the program execution service may ensure that a sufficient number of dedicated computing nodes equivalent to 212*a* are available for use by dedicated users who may have priority access to such computing nodes in various ways (e.g., maintaining a pool of such computing nodes and/or otherwise reserving a specific amount of such nodes, etc.).

In addition, the illustrated table 200 indicates a number of other computing nodes 214, such as computing nodes that may be available for other types of program execution capacity (e.g., on-demand variable program execution capacity). In this illustrated embodiment, all the computing nodes 210 are treated as being equivalent (e.g., having equivalent computing resources), although other embodiments may exist where various of the computing nodes 210 may be of different types, such that various of the requests may include indications of one or more specific types of the computing nodes to use for executing programs in satisfaction of the requests.

In table 200, during interval 205*a-c*, dedicated computing node 212*c* has been determined to be excess capacity, such as based on being unused by a dedicated capacity user to whom computing node 212*c* is allocated, and has thus been made available for use by excess capacity users. For example, the dedicated capacity user may have interacted with the program execution service to indicate that computing node 212*c* is available for excess program execution capacity, such as at some time prior to time interval 205*a*, or the program execution service may have instead automatically determined that the computing node 212*c* was unused. In the illustrated example, all other of the illustrated computing nodes (e.g., 212*a-b*, 212*d*, and 214*a-b*) have not been determined to be available during the interval 205*a*-205*c*. During time interval 205*c*, request A is received, and the program execution service determines to execute a program associated with request A on the available excess capacity computing node 212*c*, for the user-specified fee of $0.05/hour, and initiates execution of the program on computing node 212*c*. In other embodiments, the program execution service may instead have a fixed price fee that some or all excess capacity users use.

At time interval 205*d*, the program execution service determines that computing node 212*c* is no longer available to satisfy excess program execution capacity requests (e.g., based on an indication received from a dedicated capacity user reclaiming use of the computing node), and so the execution of the program associated with request A is terminated on computing node 212*b*. At interval 205*f*, the program execution service determines that two computing nodes with sufficient resources to execute request A (e.g., dedicated computing nodes 212*a* and 212*b*) are available as excess capacity computing nodes, and determines to reinitiate execution of request A's program on dedicated computing node 212*a*. In the illustrated embodiment, the diagonal lines at time interval 205*f* with respect to dedicated computing node 212*b* indicate that node 212*b* is available during that time interval for use as excess computing capacity, but is not preferred for excess computing capacity use, and thus is not selected to satisfy request A. Computing node 212*b* is not preferred for various reasons, such as it having a short and/or uncertain duration of availability (e.g., as determined by the program execution service, such as based on indications from the dedicated capacity user to whom it is allocated, based on prior history of use, based on forecasted use, etc.), whereas node 212*a* may be determined to have an availability that is likely to be relatively longer than node 212*b*. In such a situation, the program execution service may have a preference for selecting a computing node with a longer likely availability for executing a request of an excess capacity user, such as to minimize having to start/stop execution programs on the various computing nodes 210, etc. Thus, in this example, computing node 212*b* is not used during time interval 205*f*, but if another excess computing capacity request had been received prior to time interval 205*f*, node 212*b* may have nonetheless been used for that other request.

In this example, request B is received at interval 205*g*, as illustrated by table 250. In this case, there is only one excess computing node available at that time (e.g., dedicated computing node 212*a*), and the program execution service determines to terminate the execution of the program for request A in lieu of the program of request B, such as based on request B having a higher bid amount (e.g., $0.08/hour) than request A (e.g., $0.05/hour) or otherwise having a higher priority. In this example, request B is executed continuously on dedicated computing node 212*a* for a fee of $0.08/hour over the time intervals 205*g*-205*i*. At time interval 205*i*, two computing nodes are available as excess computing nodes (dedicated computing nodes 212*a* and 212*d*), each having sufficient resources for executing programs of requests A and B, and in the illustrated embodiment the program of request B remains executing on node 212*a* while the execution of the program of request A is reinitiated on node 212*d*.

At time interval 205*j*, three dedicated computing nodes are determined to be available as excess capacity computing nodes (computing nodes 212*a*, 212*c* and 212*d*), and request C is received. In this embodiment, the programs of request A and B are terminated from dedicated computing nodes 212*d* and 212*a*, respectively, and one or more programs associated with request C are executed on all three of the available excess computing nodes based on request C having an indicated preference to execute on a maximum of three nodes and having a relatively higher bid amount (e.g., $0.10/hour) than requests A and B. At time interval 205*k*, two dedicated computing nodes are determined to be available as excess computing nodes (computing nodes 212*a* and 212*c*), such as based on computing node 212*d* having been reclaimed for other purposes or otherwise having become unavailable. The one or more programs associated with request C are terminated on computing node 212*d* but remain executing on nodes 212*a* and 212*c*, such as based on the preferred maximum and minimum number of computing nodes for request C, and request C having a higher priority than requests A and B. After time interval 205*k*, the program execution service determines that request C has executed for at least two hours over the time intervals 205*j*-205*k*, and has thus expired. Accordingly, the program execution service terminates execution of the programs associated with request C on the excess capacity computing nodes, and request C is no longer treated as a pending request to be satisfied. At time interval 205*l*, one computing node (dedicated computing node 212*c*) is determined to be available for use as excess program execution capacity, and the execution of the program associated with request B is reinitiated on the computing node.

At time interval 205*m*, an indication is received (not shown) to cancel request B (e.g., an indication from the excess capacity user who submitted request B), such that the execution of the program associated with request B is terminated and request B is treated as no longer being a pending request to be satisfied. In addition, at or near this time, request D is received, having a bid amount equivalent to previously received request A (e.g., $0.05/hour). In this case, the program execution service determines to reinitiate execution of the program associated with request A on available dedicated computing node 212*c* rather than the program associated with request D, based on request A having been received at an earlier time than D. Request A continues to execute on node 212*c* until some unknown future time after time interval 205*o*. At interval 205*o*, one of the other computing nodes 214*b* becomes available for use as excess program execution capacity, and is determined to be a non-preferred excess capacity computing node, but the program of request D is nonetheless executed on the other computing node 214*b* since no other excess computing nodes are currently available.

In the illustrative example of FIG. 2, the program execution service may further track usage of the computing nodes 210 corresponding to the various requests A-D, such that the various associated users are charged fees corresponding to the bid amounts indicated by the various requests. In addition, the program execution service may also track which of the computing nodes 210 were used and/or were made available for use by excess capacity users, such that one or more users associated with those computing nodes may be given some portion of the fees collected from the excess capacity users.

It will be appreciated that the preceding example is provided for illustrative purposes, and that other embodiments may differ in various ways from the example. For example, although the computing nodes 210 are depicted as being equivalent (e.g., having equivalent computing resources), other embodiments may be provided where various of the computing nodes 210 may be of different types with varying characteristics (e.g., different amounts of processing capacity, memory, platform specification, etc.). In some such embodiments, various of the requests may include indications of one or more specific types of the computing nodes for use in executing programs associated with the requests, and those requests may only be executed on the corresponding specified type of computing node. In addition, in some embodiments, rather than excess computing capacity being based on unused dedicated computing nodes and other computing nodes as illustrated, embodiments may exist where only one group of computing nodes and/or additional groups of computing nodes may contribute to excess capacity computing nodes available for executing requests of excess capacity users. Furthermore, in some embodiments, at least some of the other computing nodes 214 may include computing nodes provided to the program execution service by one or more third parties.

As previously discussed, various types of functionality may be provided and used by a PES in various embodiments, and the functionality may be provided in various ways. For example, in some embodiments, program execution capacity available from a PES may include multiple computing nodes for executing programs on behalf of users, such as via multiple physical computing machines interconnected via one or more networks or other data exchange mediums that are capable of transmitting data between the computing machines. At least some of the computing machines may in some embodiments each include sufficient computing-related resources to execute multiple programs simultaneously (e.g., sufficient writeable memory, non-volatile storage, CPU cycles or other CPU usage measure, network bandwidth, swap space, etc.), and at least some of the computing machines in some such embodiments may each host multiple virtual machine computing nodes that each may execute one or more programs on behalf of a distinct user. Furthermore, in various embodiments, a PES may execute various types of programs on behalf of multiple users. For example, such programs executed on behalf of users may include one or more operating systems, applications (e.g., servers and/or other software applications), utilities, libraries, etc. In addition, in at least some embodiments, such programs may include executable software images, such as virtual machine images that are bootable or otherwise loadable on one or more virtual machine computing nodes, and that each may include operating system software, software for one or more application programs, and/or configuration information, etc.

In at least some embodiments, the execution of one or more programs on one or more computing nodes by a PES may be initiated in response to a current execution request for immediate execution of those programs. Alternatively, the initiation may be based on a previously received program execution request that scheduled or otherwise reserved the then-future execution of those programs for the now-current time. Program execution requests may be received in various ways, such as directly from a user (e.g., via an interactive console or other GUI provided by the program execution service), or from an executing program of a user that automatically initiates the execution of one or more other programs or other instances of itself (e.g., via an API, or application programming interface, provided by the program execution service, such as an API that uses Web services). Program execution requests may include various information to be used in the initiation of the execution of one or more programs, such as an executable or other copy of a program to be executed, an indication of a program that was previously registered or otherwise supplied for execution, and a number of instances of the program that are to be executed simultaneously (e.g., expressed as a single desired number of instances, as a minimum and maximum number of desired instances, etc.), as well as a variety of other types of preferences and/or requirements for execution of one or more programs (e.g., resource allocation, geographical and/or logical location for execution, proximity of execution to other programs and/or computing nodes, timing-related criteria, etc.).

After receiving a request to execute one or more instances of a program at an indicated time, the PES may determine one or more computing nodes to use in executing the program instances. In some embodiments, the determination of the computing nodes to be used is performed at the time of the request even if for future execution. In other embodiments, the determination of the computing nodes to be used for future execution of one or more program instances may be deferred to a later time, such as at the future time of execution based on information that is then available. In some embodiments, the determination of which computing nodes to use for execution of one or more programs on behalf of a user may be made prior to a request to execute, such as at a time when a user subscribes and/or registers to use the PES, and/or at another time prior to a request to execute programs for a user. For example, in some such embodiments, one or more computing nodes may be associated with a user for a period of time, such that programs may be executed on behalf of that user on the associated computing nodes at any time during that period, such as at any time a request is received to execute software for the user during the period. In addition, in some embodiments, the determination of which computing nodes to use to execute programs on behalf of a user may be made when one or more computing nodes and/or computing resources of one or more computing nodes become available for executing programs for the user, such as, for example to execute programs of one or more pending requests on one or more computing nodes at a time when the computing nodes are unused and/or are otherwise available for executing the programs.

The determination of which computing nodes to use for execution of each program instance may be made in a variety of ways, including based on any preferences and/or requirements specified in the request or otherwise specified for the program and/or associated user (e.g., at a time of registration, etc.). For example, if criteria are determined for preferred and/or required resources for execution of a program instance (e.g., memory and/or storage; CPU type, cycles or other performance metric; network capacity; platform type, etc.), the determination of an appropriate computing node to execute a program instance may be based at least in part on whether a computing node has sufficient resources available to satisfy those resource criteria. Additional details related to executing and configuring programs to execute on a program execution service are included in pending U.S. patent application Ser. No. 11/395,463, filed Mar. 31, 2006 and entitled "Managing Execution of Programs by Multiple Computing Systems," which is hereby incorporated by reference in its entirety.

In addition, as previously noted, in at least some embodiments, execution of a program using excess program execution capacity that is automatically terminated may be automatically reinitiated at a later time by the PES. For example, in some such cases, the PES may continue to try to execute a program until completion of the requested execution (e.g., until cancelled or otherwise explicitly terminated by a user, until an indication is received that the one or more programs have completed one or more tasks, etc.), until occurrence of a specified time (e.g., until occurrence of an expiration time, until occurrence of a cumulative execution time, etc), until occurrence of a specified number of executions, indefinitely, etc.

In some embodiments, fees may be associated with the use of a PES, such that the PES may execute programs on behalf of a user in exchange for payment of one or more fees by that user. For example, in some embodiments, fees may be charged to a user based on an amount and/or type of program execution capacity allocated for executing one or more programs on behalf of a user, such as based on one or more of a number of processing units, an amount of memory, an amount of storage, an amount of network resources, etc., allocated for executing programs of the user. In some embodiments, fees may be based on other factors, such as various characteristics of the computing resources used to execute programs, such as, for example, based on CPU capabilities or performance, platform type (e.g., 32-bit, 64-bit, etc.), etc. In some embodiments, fees may be charged on the basis of a variety of use factors, such as a price per use of the service, a price per unit of time that computing services are used, a price per storage used, a price per data transferred in and/or out, etc. In at least some embodiments, as discussed in more detail below, fees may be based on various other factors, such as related to availability of the program execution capacity (e.g., varying degrees of availability, such as guaranteed availability and/or variable availability) and/or various properties related to executing programs (e.g., continuity of execution, fault tolerance, etc.). In at least some embodiments, a provider of a PES may offer one or more of various tiers, types and/or levels of services or functionality for executing programs on behalf of multiple users, and in some such embodiments, various fees may be associated with the various tiers, types and/or levels of services. For example, in some embodiments, a user may be charged one or more fees in conjunction with use of dedicated program execution capacity functionality provided by a PES, such as fees that are respectively lower than fees associated with comparable use of an on-demand variable program execution capacity service of the PES. The lower fees may reflect, for example, the user entering into a long-term agreement for a specified use time period (e.g., a number of weeks, months, years, etc.), such as to pay one or more specific rates over the term of the agreement (e.g., up front and/or periodically). In addition, for example, tiers may be used for a specific type of functionality provided by a PES, such as to charge fees at a first tier for a first quantity of dedicated program execution capacity functionality (e.g., up to a specified first threshold of computing nodes being used), to charge fees at a second tier (e.g., a lower price tier) for a second quantity of dedicated program execution capacity functionality (e.g., above the specified first threshold and up to a specified second threshold of computing nodes being used), etc. Tiers may further be based on various factors other than quantity of functionality that is used in at least some embodiments, whether instead of or in addition to being based on quantity of functionality used. Additional details related to various fees associated with a program execution service are included in pending U.S. patent application Ser. No. 11/963,331, filed Dec. 21, 2007 and entitled "Providing Configurable Pricing for Execution of Software Images," which is hereby incorporated by reference in its entirety.

A specified use time period for a period of dedicated computing capacity may be specified in various manners in various embodiments, such as to indicate a specified period of time in which a user has access to dedicated program execution capacity (e.g., a number of days, weeks, months, years, etc.), a duration of time in which one or more programs may be continuously executed for a user (e.g., a number of hours the one or more programs may execute within any given period, such as an hour a day, an hour a week, etc.), a window of time in which one or more programs may execute (e.g., between 1:00 p.m. and 3:00 p.m. every other day), etc. As previously noted, in some embodiments an electronic marketplace may be provided for users of a PES, such that dedicated program execution capacity users may provide some or all of their specified use time period for dedicated program execution capacity to one or more other users in exchange for payment from those one or more other users, such that the one or more other users may use the provided portions of dedicated program execution capacity to execute programs on behalf of the one or more other users, and the dedicated program execution capacity user may receive payment for such use. In other embodiments, a dedicated program execution capacity user may temporarily provide use of some portion of her dedicated program execution capacity for use by one or more users based in part on the one or more other users having an urgent need of the program execution capacity, such as indicated by a willingness of the one or more users to pay a premium for use of the dedicated program execution capacity (e.g., a rate greater than that paid by the dedicated program execution capacity user), and in at least some such embodiments a portion and/or all of the fees collected from the one or more users may be provided to the dedicated capacity user.

Furthermore, various other types of functionality may be provided and used by a PES in various embodiments, as discussed in greater detail elsewhere.

Figure 3:
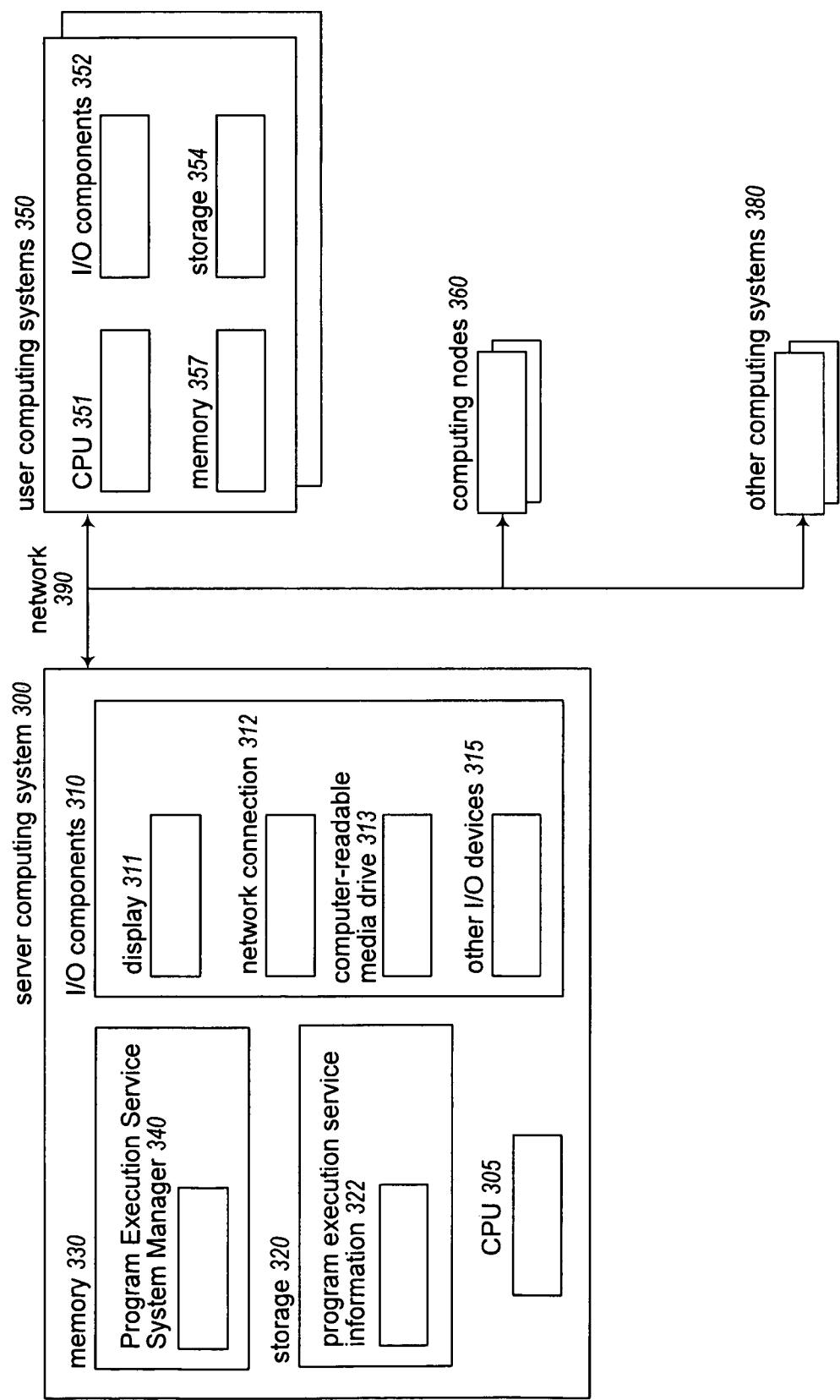
FIG. 3 is a block diagram illustrating an example embodiment of a computing system for managing use of computing nodes by multiple users.

FIG. 3 is a block diagram illustrating an example embodiment of a system suitable for performing techniques to manage use of computing nodes by multiple users. In particular, FIG. 3 illustrates a server computing system 300 suitable for executing an embodiment of a Program Execution Service System Manager module, as well as various user computing systems 350, computing nodes 360, and other computing systems 380. In the illustrated embodiment, the server computing system 300 has components that include a CPU 305, various I/O components 310, storage 320, and memory 330.

The illustrated I/O components include a display 311, a network connection 312, a computer-readable media drive 313, and other I/O devices 315 (e.g., a keyboard, a mouse, speakers, etc.). In addition, the illustrated user computing systems 350 have components similar to those of server computing system 300, including a CPU 351, I/O components 352, storage 354, and memory 357. The other computing systems 380 and computing nodes 360 may also each include similar components to some or all of the components illustrated with respect to server computing system 300, but such components are not illustrated in this example for the sake of brevity.

An embodiment of a Program Execution Service System Manager module 340 is executing in memory 330, and it interacts with computing systems 350 and 380 and computing nodes 360 over the network 390 (e.g., via the Internet and/or the World Wide Web, via a private cellular network, etc.). In this example embodiment, the PESSM 340 includes functionality related to managing use of multiple computing nodes 360 by various users (not shown) interacting with user computing systems 350, such as in conjunction with a program execution service managed by the PESSM 340. The other computing systems 350 and 380 and computing nodes 360 may be executing various software as part of interactions with the PESSM. For example, user computing systems 350 may be executing software in memory 357 to interact with PESSM 340 (e.g., as part of a Web browser or specialized client-side application program), such as to configure and/or request execution of programs on behalf of the users of those systems on one or more computing nodes 360 in various ways, such as related to variable execution capacity use, dedicated execution capacity use, and/or excess execution capacity use. In addition, one or more users of the user computing systems 350 may interact with PESSM 340 to perform various other types of actions, as discussed in greater detail elsewhere. Various information related to the functionality of the PESSM module 340 may be stored in storage 320, such as information 322, and may include information related to configuration, execution and/or registration for executing programs on behalf of multiple users.

After the PESSM module 340 receives requests (or other indications) to execute one or more programs on one or more computing nodes 360, the PESSM module 340 selects the one or more computing nodes that will execute the one or more programs, and initiates execution of those programs on those computing nodes 360. In addition, the PESSM module 340 may further interact with computing nodes 360 to terminate execution of initiated programs on the computing nodes, to migrate one or more of the programs to one or more other computing nodes 360 or computing systems 380, etc. In addition, the PESSM module 340 may monitor or otherwise interact with one or more of the computing nodes 360 to track use of those computing nodes. The computing nodes 360 may have various forms in various embodiments, such as to include a number of physical computing systems and/or a number of virtual machines executing on one or more physical computing systems. In some embodiments, the server computing system 300 and computing nodes 360 may be part of a data center or other group of co-located computing systems, or may otherwise be computing nodes of a private network. In addition, in some embodiments, the PESSM module 340 may interact with one or more other computing systems 380 to initiate or terminate execution of one or more programs on those computing systems, such as if the computing systems 380 are provided by one or more third-party participants who are providing excess program execution capacity for use by other users. In some embodiments, the PESSM module 340 may further or instead manage access to one or more types of computing-related resources or services other than program execution services (e.g., persistent or temporary data storage services, messaging services, database services, etc.).

It will be appreciated that computing systems 300, 350 and 380 and computing nodes 360 are merely illustrative and are not intended to limit the scope of the present invention. The computing systems and/or nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system may comprise any combination of hardware or software that may interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated PESSM module 340 may in some embodiments be distributed in additional modules. Similarly, in some embodiments some of the functionality of the PESSM module 340 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
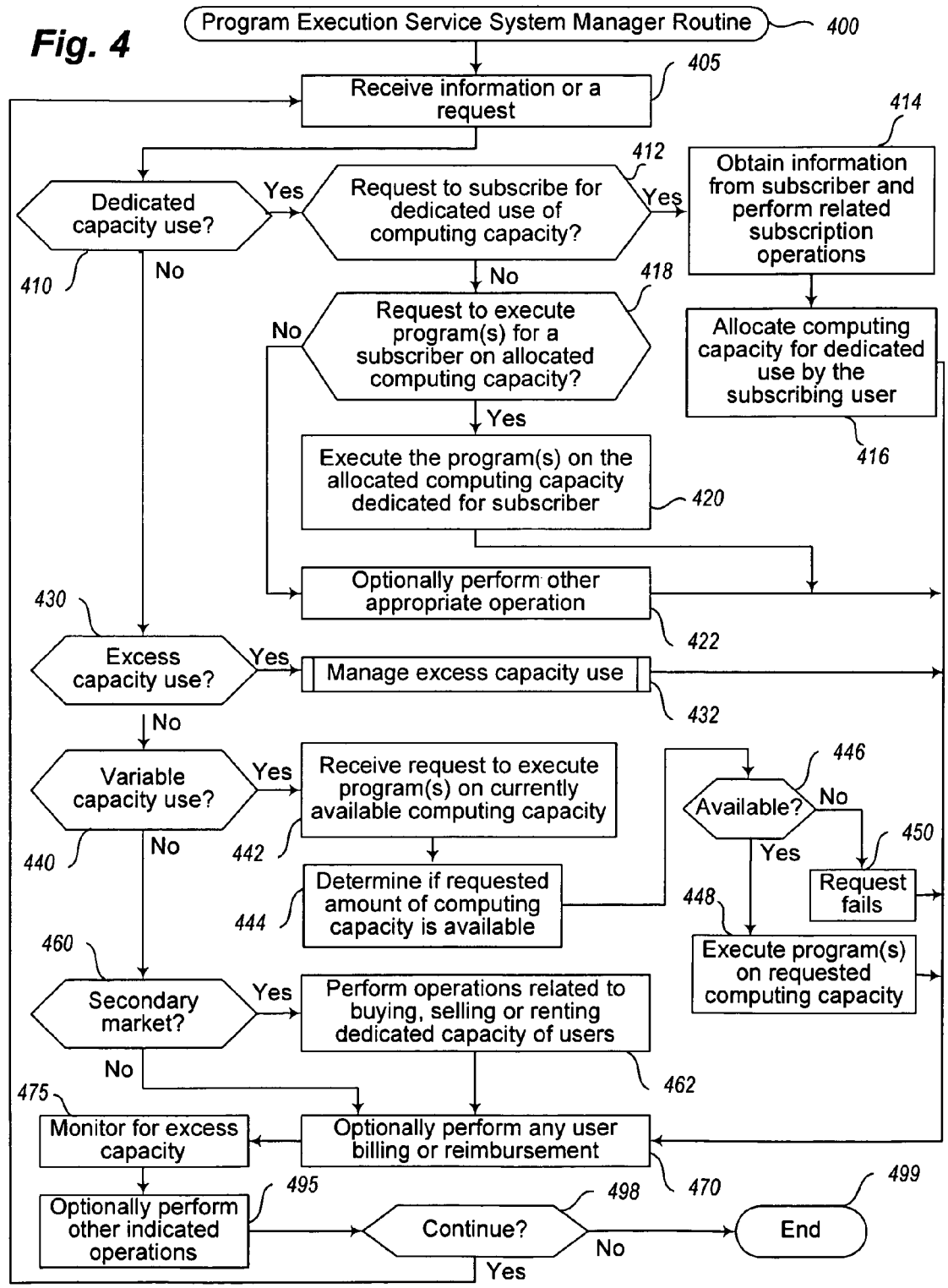
FIG. 4 illustrates a flow diagram of an example embodiment of a Program Execution Service System Manager routine.

FIG. 4 is a flow diagram of an example embodiment of a Program Execution Service System Manager routine 400. The routine may be provided by, for example, execution of the PESSM modules 110 and 180 of FIGS. 1A and 1B, respectively, and/or the PESSM module 340 of FIG. 3, such as to assist in managing use of multiple computing nodes and/or other types of program execution capacity, as well as to perform other types of management operations in some situations. In this illustrated embodiment, the routine 400 manages various aspects of use of a program execution service that provides program execution capacity for executing programs on behalf of multiple users.

In the illustrated embodiment, the routine begins at block 405, where information or a request is received. The routine continues to block 410 to determine if the received request or information is related to dedicated capacity use. If so, the routine continues to block 412, where the routine determines whether a request has been received from a user to subscribe for use of dedicated program execution capacity. If so, the routine continues to block 414 where information is obtained from a subscribing user and various operations related to subscribing for use of dedicated program execution capacity are performed. For example, in some embodiments a user may select and/or indicate one or more computing nodes to which the user would like dedicated access. As discussed elsewhere, in some embodiments, a user may select from one or more of various types of computing nodes and/or may otherwise specify various amounts and/or types of computing resources desired (e.g., processing unit type/amount, memory amount, platform specification, etc.). In addition, a subscribing user may also indicate a desired time period of use over which the user would like dedicated access (e.g., a number of hours, weeks, months, years, etc.), and/or may provide other information (e.g., billing information, indications of programs to execute on behalf of the user, scheduling information for executing one or programs at one or more future times, etc.).

After a subscriber provides information related to a type and/or amount of desired dedicated program execution capacity, the routine continues to block 416 where an appropriate amount of requested program execution capacity is allocated for dedicated use by the subscribing user if possible. As discussed elsewhere, program execution capacity (e.g., one or more computing nodes) may be allocated and/or assigned for use by a particular subscribing dedicated capacity user in various ways in various embodiments.

If instead at block 412 it is determined that a request to subscribe for use of dedicated program execution capacity is not received, the routine instead continues to block 418, where the routine determines whether a request is received to execute one or more programs on behalf of a subscriber on allocated program execution capacity (e.g., a current request for immediate execution, a previously scheduled request for execution, etc.). In some embodiments, the routine may ensure that the request for execution has been received within an appropriate use period and/or may otherwise authorize the request (e.g., authenticate the request, authorize the user, etc.). If such a request is received, the routine continues to block 420 to perform the requested execution, such as by initiating the execution of the one or more programs on the allocated program execution capacity. In some embodiments, the routine may select computing resources and/or computing nodes on which to execute the programs in various ways, and in some situations the routine may terminate one or more programs of other users (e.g., excess capacity users) and/or otherwise free computing resources to perform the requested execution. In some embodiments, if a dedicated capacity user previously supplied some amount of her allocated dedicated program execution capacity for use by one or more other users, such as for use by excess capacity users, then the supplied amount of dedicated capacity may not be available for use by the dedicated user at the time of a request for execution, unless the user is able to reclaim the capacity for the request.

If it is instead determined at block 418 that a request to execute one or more programs on behalf of a subscribing user on allocated program execution capacity is not received, the routine continues to block 422 to optionally perform one or more other indicated operations related to dedicated capacity use as appropriate. For example, in some embodiments, such operations may include indicating some amount of dedicated program execution capacity to make available as excess program execution capacity and/or indicating that some amount of previously specified program execution capacity is to be reclaimed for use by the dedicated capacity user.

If instead, at block 410, it is determined that information or a request related to dedicated capacity use is not received, the routine continues to block 430 to determine if the information or request is related to excess computing capacity use. If so, the routine continues to block 432 to manage excess capacity use, such as discussed in detail with respect to FIG. 5. If it is instead determined at block 430 that information or a request related to excess capacity use is not received, the routine continues to block 440 to determine if the information or request is related to variable capacity use. If so, the routine continues to block 442, where a request to execute one or more programs on currently available variable program execution capacity is received (e.g., a current request for immediate execution, a previously scheduled request, etc.). As discussed elsewhere, such a request may specify various types and/or amounts of program execution capacity on which to execute one or more programs on behalf of a variable capacity user. At blocks 444 and 446, the routine determines whether the requested program execution capacity is currently available. If so, the routine continues to block 448 to initiate the execution of one or more indicated programs on the available variable program execution capacity. If not, the routine continues to block 450, where the request for variable program execution capacity fails, such as by not executing the requested one or more programs. In addition, in some embodiments, in response to a request to execute programs on variable program execution capacity, the routine may automatically terminate one or more programs of excess capacity users to free variable program execution capacity.

If it is instead determined at block 440 that information or a request related to variable capacity use is not received, the routine continues to block 460 to determine if the information or request is related to a secondary dedicated capacity market, and if so, the routine continues to block 462 to perform one or more indicated operations as appropriate related to a secondary dedicated capacity market. For example, in various embodiments, such operations may include one or more of indications from dedicated capacity users to sell and/or rent various amounts of the users' dedicated program execution capacity, indications from one or more other users to buy and/or rent program execution capacity from dedicated capacity users, indications from one or more urgent users who may be willing to pay a premium for various amounts of program execution capacity, etc.

After blocks 416, 420, 422, 432, 448, 450, and 462, or if it is instead determined in block 460 that information or a request related to a secondary dedicated capacity market is not received, the routine continues to block 470 to optionally perform any user billing or reimbursement activities based on the information or request received in block 405 or as is otherwise initiated (e.g., periodically), such as to charge and/or collect fees from one or more users (e.g., dedicated capacity users, variable capacity users, excess capacity users, and/or others) based on program execution functionality provided to the users, and/or to pay and/or reimburse one or more users (e.g., dedicated capacity users and/or others who provided computing resources for use by excess capacity users, etc.) for functionality provided by or enabled by the users.

After block 470, the routine continues to block 475 to optionally monitor for excess program execution capacity, such that program execution capacity may be added and/or removed from the excess program execution capacity available for use by one or more excess capacity users. In other embodiments, the routine may receive other indications of current and/or expected usage of program execution capacity, such as notifications from one or more computing resources of the program execution service (e.g., such as computing nodes with resident monitors that may indicate current usage status), notifications from one or more users, and/or may otherwise determine when computing resources are and/or are likely to be used, unused, or underutilized.

Next, the routine continues to block 495 to optionally perform one or more other indicated operations. In some embodiments, such operations may include configuring use of various resources and/or functionality of the program execution service for users, subscription or registration operations, scheduling operations, etc. After block 495, the routine continues to block 498 to determine whether to continue, such as until an explicit indication to terminate execution of the routine. If so, the routine returns to block 405, and if not, the routine continues to block 499 and ends.

FIG. 5 is a flow diagram of an example embodiment of a Capacity Usage Manager routine 500. The routine may be provided by, for example, execution of the PESSM modules 110 and 180 of FIGS. 1A and 1B, respectively, and/or the PESSM module 340 of FIG. 3, such as may be initiated from block 432 of routine 400 in FIG. 4.

In the illustrated embodiment, upon invocation of the routine 500, a request, information and/or other indication related to excess capacity use is provided to the routine. At block 505, the routine determines whether an indication is received to add program execution capacity to available excess program execution capacity, such as based on information obtained with respect to block 475 of routine 400 of FIG. 4. If so, the routine continues to block 510 to add the indicated program execution capacity to available program execution capacity. For example, in some embodiments, the routine may add one or more indications of such indicated program execution capacity (e.g., one or more particular computing nodes, etc.) to a pool of available program execution capacity. In some embodiments, multiple pools may be provided, such that, for example, various types of program execution capacity may be available as excess program execution capacity and may be grouped into one or more pools associated with the type of program execution capacity. If it is instead determined at block 505 that an indication to add program execution capacity to available excess program execution capacity is not received, the routine continues to block 515 to determine whether an indication is received to remove program execution capacity from the available excess program execution capacity, and if so, the routine continues to block 520 to remove the indicated program execution capacity from the available excess program execution capacity, such that the indicated program execution capacity (or an equivalent amount of program execution capacity) is no longer available as excess program execution capacity to execute programs on behalf of excess capacity users, such as based on information obtained with respect to blocks 420, 448 and/or 475 of routine 400 of FIG. 4.

If it is instead determined in block 515 that an indication to remove program execution capacity from available program execution capacity is not received, the routine continues instead to block 525 to determine whether a request to execute one or more programs on some amount of available excess program execution capacity on behalf of an excess capacity user is received (or a previously scheduled request for such execution has been triggered). If so, the routine continues to block 530 to optionally obtain or receive information from a requesting excess capacity user related to requested execution. In some embodiments, such information may include configuration information such as indications of an amount and/or type of program execution capacity requested (e.g., including minimum and maximum amounts), a bid amount (e.g., including minimum and maximum bid amounts), an expiration time, etc. In some embodiments, some or all such information may instead be received as part of a request for execution or as part of a separate configuration and/or registration performed by an excess capacity user. In addition, in some embodiments, the routine may provide feedback to an excess capacity user of one or more types, such as indicating likely characteristics of the requested execution (e.g., a likely time that the request will be executed, a likely duration of execution, etc.) and/or optional other information (e.g., suggested configurations). After block 530, the routine continues to block 535 to add the request to a group of current requests for execution on excess program execution capacity. In other embodiments, rather than add the request to a group of other requests, the routine may instead attempt to immediately satisfy the request, such as by determining whether there is available excess program execution capacity to execute the request at that immediate time, and initiating execution of the programs if so, or failing if not.

If it is instead determined at block 525 that a request to execute programs on available excess program execution capacity is not received, the routine continues to block 540 to determine whether a request to remove an indicated previous request for execution is received (e.g., a indicated request for execution that was previously added to the group of requests at block 535), such as a request from an excess capacity user to cancel a current request for execution and/or a received indication that the request has otherwise expired, etc. If so, the routine continues to block 545 to terminate any programs associated with the indicated request that are currently executing on some amount of excess program execution capacity, and then continues to block 550 to remove the indicated request from the group of requests, such that the indicated request will not subsequently be considered for execution on excess program execution capacity.

After blocks 510, 520, 535 and 550, or if it was instead determined at block 540 that a request to remove an indicated request for execution is not received, the routine continues to block 555 to determine whether to manage current requests for execution on excess program execution capacity. For example, in some embodiments, an indication may have been passed into the routine 500 to manage the requests and/or may have been provided based upon a change in the available program execution capacity (e.g., by adding to or removing from the available program execution capacity in blocks 510 and 520, respectively), and/or a change in the current request for execution (e.g., by adding or removing requests in blocks 535 and 550, respectively), etc. If so, the routine continues to block 560 to determine an amount of currently available excess program execution capacity, such as including an amount of program execution capacity added and/or removed from the available program execution capacity at blocks 510 and 520, respectively. After block 560, the routine continues to block 565 to allocate groups of the currently available excess program execution capacity for use by one or more of the requests in the group based at least in part on priorities associated with the requests. For example, in some embodiments, the routine attempts to allocate to each request in the group an amount of the excess program execution capacity that the request specified for execution of programs (e.g., a number of computing nodes specified, etc.). In some such embodiments, if there is sufficient currently available excess program execution capacity to satisfy all the current requests for execution in the group of requests, then each of the requests will be allocated a requested amount of the excess program execution capacity for executing programs associated with the request. In cases where there is not sufficient currently available excess program execution capacity to satisfy all the current requests, the routine prioritizes the requests and attempts to satisfy higher priority requests prior to lower priority requests. In various embodiments, priority may be based on one or more of a bid amount, a time at which the request was received, etc. In various embodiments, the routine may determine which of the currently available excess program execution capacity to allocate for use by the requests in various ways, such as described elsewhere.

After block 565, the routine continues to block 570 to terminate any executing programs associated with a request that are executing on excess program execution capacity that was not allocated for use by the request in block 565, such as to reflect that the request has expired or was not sufficiently high priority to result in current ongoing satisfaction. In block 575, the routine then executes one or more programs associated with each of the requests (and/or leaves previously executing programs on excess program execution capacity that was selected for ongoing execution in block 565). After block 575, the routine continues to block 580 to optionally perform housekeeping operations. For example, in some embodiments, the routine may detect and indicate if there are any requests for execution in the group of requests that are expired or otherwise should be removed.

If it is instead determined at block 555 not to manage current requests for execution on excess program execution capacity, the routine continues to block 595 to optionally perform one or more other indicated operations as appropriate. After blocks 580 and 595, the routine continues to block 599 and returns.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention.

Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for a program execution service to manage execution of programs for users, the method comprising:

after receiving a request from a first user of the program execution service to reserve a computing node to provide guaranteed availability for the first user to execute one or more programs, allocating, by one or more configured computing systems of the program execution service, one of a plurality of computing nodes provided by the program execution service to be reserved for guaranteed use by the first user;

in response to a request from the first user, initiating, by the one or more configured computing systems, execution at a first time of a first program on the allocated one computing node reserved for the first user;

receiving, by the one or more configured computing systems, a request to execute a second program of a second user on a computing node of the program execution service in a non-guaranteed manner such that the non-guaranteed execution of the second program may be terminated by the program execution service at any time;

monitoring, by the one or more configured computing systems, the execution of the first program on the allocated one computing node reserved for the first user and determining that the allocated one computing node is not currently executing any programs for the first user at a second time after the first time;

initiating, by the one or more configured computing systems, the non-guaranteed execution of the second program at the second time on the allocated one computing node on behalf of the second user; and after receiving a request from the first user at a third time after the second time to execute one or more indicated programs on the allocated one computing node reserved for the first user, determining to terminate execution of the second program on the allocated one computing node;

terminating execution of the second program on the allocated one computing node; and initiating execution of the one or more indicated programs on the allocated one computing node on behalf of the first user.

2. The method of claim 1 wherein the program execution service is a fee-based service such that the first user pays a first fee for the allocating of the one computing node for reserved use by the first user and such that the second user pays a second fee for the non-guaranteed execution of the second program on the allocated one computing node, the second fee being less than the first fee, and wherein at least a portion of the second fee is provided to the first user for use of the allocated one computing node in executing the second program on behalf of the second user.

3. The method of claim 2 wherein the first user is part of a first group of multiple users to whom multiple of the plurality of computing nodes are allocated for priority access, wherein the second fee paid by the second user is based at least in part on an amount bid by the second user as part of the received request to execute the second program of the second user, wherein one or more other users also place bids as part of received requests for non-guaranteed execution of programs on behalf of the one or more other users, wherein the initiating of the non-guaranteed execution of the second program on the allocated one computing node includes selecting the received request from the second user before the received requests from the one or more other users based at least in part on the amount bid by the second user being higher than the bids placed by the one or more other users, and wherein the received requests of at least one of the one or more other users is not satisfied based at least in part on none of the multiple allocated computing nodes being available to execute the programs on behalf of the at least one other users.

4. A computer-implemented method for a program execution service to manage execution of programs for users, the method comprising:

allocating, by one or more configured computing systems of a program execution service, one or more computing nodes of the program execution service to a first user of the program execution service to provide the first user with priority access to the allocated computing nodes;

determining, by the one or more configured computing systems, a group including at least one computing node of the program execution service to satisfy a request to execute a program for a second user, the at least one computing node of the determined group including one of the allocated computing nodes;

initiating, by the one or more configured computing systems, execution of the program of the second user on the at least one computing node of the determined group; and after receiving an indication to execute one or more programs of the first user, determining, by the one or more configured computing systems, to terminate execution of the program of the second user on the included one allocated computing node; terminating, by the one or more configured computing systems, execution of the program of the second user on the included one allocated computing node; and making the included one allocated computing node available, by the one or more configured computing systems, to execute the one or more programs of the first user based at least in part on the terminating.

5. The method of claim 4 wherein the received indication to execute the one or more programs of the first user is based on a request from the first user to execute an indicated program on the allocated computing nodes, and wherein the method further comprises, after the terminating of the execution of the program of the second user on the one allocated computing node, executing the indicated program of the first user on the one allocated computing node.

6. The method of claim 4 wherein the one or more computing nodes are allocated to the first user to provide the first user with the priority access to the allocated computing nodes during a specified period of time, wherein the priority access of the first user to the allocated computing nodes is dedicated access such that a request by the first user to execute a program on the allocated computing nodes during the specified period of time is guaranteed to be satisfied, wherein the one allocated computing node is not executing a program for the first user at a time of the determining of the group of one or more computing nodes, and wherein the execution of the program of the second user on the one or more computing nodes of the determined group is performed in a non-guaranteed manner such that the execution of the program of the second user is allowed to be terminated at any time.

7. The method of claim 6 wherein the allocated computing nodes and the at least one computing nodes of the determined group are a subset of a plurality of computing nodes provided by the program execution service, wherein some of the plurality of computing nodes are not allocated to give dedicated access to users of the program execution service and are maintained to dynamically satisfy at least some other requests from users for immediate execution of programs, such that the other requests for immediate execution are not guaranteed to be satisfied and such that execution of programs for satisfied requests using the some computing nodes are not subject to termination, and wherein the method further comprises receiving other requests from other users for immediate execution of indicated programs and satisfying at least some of the received other requests by initiating execution of the indicated programs on the some computing nodes.

8. The method of claim 4 wherein the program execution service is a fee-based service such that the first user pays one or more first fees for the priority access to the allocated computing nodes and such that the second user pays a second fee for execution of the program of the second user, the second fee being less than the one or more first fees based at least in part on the execution of the program of the second user not having priority access.

9. The method of claim 4 wherein the request to execute the program of the second user reflects that the execution of the program of the second user is time-sensitive, and wherein the program execution service is a fee-based service such that the first user pays one or more first fees for the priority access to the allocated computing nodes and such that the second user pays a second fee for execution of the program of the second user, the second fee being more than the one or more first fees based at least in part on the execution of the program of the second user being time-sensitive.

10. The method of claim 4 wherein the received request to execute the program of the second user includes a bid amount specified by the second user to be paid to the program execution service by the second user for executing the program on behalf of the second user on a specified quantity of computing nodes.

11. The method of claim 10 wherein at least some of the bid amount is provided to the first user based at least in part on use of the one allocated computing nodes for executing the program of the second user.

12. The method of claim 4 wherein the one or more computing nodes are allocated to the first user for a specified period of time, wherein the received request to execute the program of the second user is an indicated acceptance by the second user of a prior offer by the first user to allow others to use the one or more allocated computing nodes of the first user for a subset of the specified period of time, wherein the determining of the group of computing nodes includes selecting the one allocated computing node based on the indicated acceptance of the prior offer, and wherein the terminating of the execution of the program of the second user occurs after the subset of the specified period of time is complete.

13. The method of claim 4 wherein the one or more computing nodes are allocated to the first user for a specified period of time, wherein a third user of the program execution service is given priority access to one or more other computing nodes of the program execution service that are allocated to the third user for the specified period of time, the one or more other computing nodes being distinct from the one or more computing nodes allocated to the first user and from the at least one computing nodes of the determined group, and wherein the method further comprises:

receiving a request from a fourth user of the program execution service to execute a program of the fourth user using the one or more other computing nodes allocated to the third user; and if the third user has provided consent, transferring the priority access to the one or more other allocated computing nodes from the third user to the fourth user to enable the fourth user to receive priority access to the one or more allocated other computing nodes during a remaining portion of the specified period of time.

14. The method of claim 4 wherein the first user is part of a first group of multiple users to whom multiple of a plurality of computing nodes of the program execution service are allocated for priority access, wherein the terminating of the execution of the program of the second user on the one allocated computing node includes saving execution state of the program at a time of the terminating, and wherein the method further comprises, at a second time after the time of the terminating:

determining a second group of computing nodes of the program execution service that are available to execute the program of the second user at the second time, the determined second group including one or more of the multiple allocated computing nodes that are not currently executing programs on behalf of the users of the first group at the second time; and reinitiating execution of the program of the second user on the computing nodes of the determined second group in such a manner as to restore the saved execution state of the program.

15. The method of claim 14 wherein the program execution service uses virtualization technology such that the plurality of computing nodes include, for each of multiple physical computing systems, multiple virtual machines hosted by the physical computing system that are each able to execute at least one program, wherein the at least one computing nodes of the determined group are each hosted virtual machines, wherein the program of the second user is a virtual machine image, and wherein the saving of the execution state of the program and the reinitiating of the execution of the program are based at least in part on the virtualization technology used by the program execution service.

16. The method of claim 4 wherein inclusion in the determined group of the one allocated computing node is based at least in part on a prior indication from the first user that the one allocated computing node is available for use to execute programs of other users.

17. The method of claim 4 wherein inclusion of the one allocated computing node in the determined group is based at least in part on monitoring execution of programs on the one or more allocated computing nodes to determine which of the one or more allocated computing nodes is not currently executing any program for a user of the program execution service.

18. The method of claim 4 wherein the one or more computing nodes are allocated to the first user for a specified period of time, wherein the first user is part of a first group of multiple users to whom multiple of a plurality of computing nodes of the program execution service are allocated for priority access, and wherein the method further comprises:

receiving multiple other requests from multiple other users of the program execution service, the other users being distinct from the users of the first group and from the second user, each of the other requests including a request to execute a respective program of a respective other user during at least some of the specified period of time;

determining a subgroup of the multiple other requests to execute on computing nodes of the program execution service, the determining of which of the multiple other requests to include in the subgroup being based at least part on a determined priority of each of the other requests, such that each request of the subgroup is determined to be of higher priority than other requests that are not in the subgroup; and for each of the requests of the subgroup, initiating execution of the respective program of the request on at least one of the multiple allocated computing nodes that is not currently executing programs on behalf of the users of the first group.

19. The method of claim 18 wherein the determined priority of each of the other requests is based on at least one of a monetary bid associated with the other request, of a quantity of computing nodes to use to satisfy the request, and of a time of executing the respective program of the request.

20. The method of claim 4 wherein the program execution service is remote from the first user and from the second user, wherein the program execution service provides one or more Application Programming Interfaces (APIs) for remote computing systems to programmatically interact with the program execution service over one or more networks, and wherein the allocating of the one or more computing nodes to the first user and the receiving by the program execution service of the request to execute the program of the second user are initiated based on programmatic interactions received by the program execution service via the one or more APIs.

21. The method of claim 4 wherein the one or more computing nodes are allocated to the first user for a specified period of time, wherein the second user further has priority access to one or more other computing nodes of the program execution service that are allocated to the second user during the specified period of time, the one or more other computing nodes being distinct from the one or more computing nodes allocated to the first user, and wherein the second user further executes an indicated program during the specified period of time on the one or more other computing nodes allocated to the second user, such that the indicated program executes on the one or more other computing nodes allocated to the second user at a same time that the program of the second user executes on the at least one computing nodes of the determined group.

22. A computing system configured to manage execution of programs for users, comprising:
one or more processors; and
a system manager component that is configured to, when executed by at least one of the one or more processors, manage execution of programs for users of a program execution service by:
receiving an indication to execute a first program of a first user using a specified first amount of computing capacity of the program execution service;
initiating execution of the first program of the first user using a group of computing resources of the program execution service that is determined to provide the first amount of computing capacity;
receiving an indication of a second amount of computing capacity of the program execution service for executing a second program of a second user, the second amount of computing capacity being dedicated for executing programs of the second user in accordance with priority access of the second user to the program execution service;
determining that at least some of the group of computing resources used for executing the first program of the first user is needed to provide the second amount of computing capacity to execute the second program;
terminating use of the at least some computing resources to execute the first program of the first user; and
initiating execution of the second program of the second user using the at least some computing resources.

23. The computing system of claim 22 wherein the computing resources of the program execution service include a plurality of computing nodes that are each configurable to execute one or more programs for one or more of the users of the program execution service, wherein the second amount of computing capacity that is dedicated for executing programs of the second user includes at least one of the plurality of computing nodes that is reserved for use by the second user in executing programs, wherein the group of computing resources includes one or more of the at least one computing nodes reserved for use by the second user, wherein the received indication to execute the first program is a request by the first user to execute the first program, and wherein the received indication of the second amount of computing capacity to execute the second program is a request by the second user to execute the second program.

24. The computing system of claim 23 wherein the managing of the execution of the programs for the users of the program execution service includes determining the group of the computing resources to provide the first amount of computing capacity, the computing resources of the determined group including a subset of computing cycles of a particular computing node that is currently executing one or more programs for the second user, and wherein the initiating of the execution of the first program includes executing the first program on the particular computing node simultaneously with the currently executing one or more programs of the second user, such that the first program of the first user executes using the subset of the computing cycles of the particular computing node.

25. The computing system of claim 22 wherein the system manager component includes software instructions for execution by the at least one processors of the computing system.

26. The computing system of claim 22 wherein the system manager component consists of a means for performing the managing of the execution of the programs for the users of the program execution service.

27. A non-transitory computer-readable medium whose contents configure a computing system of a program execution service to perform a method for managing execution of programs for users, the method comprising:
allocating one or more computing nodes of the program execution service to a first user of the program execution service to provide the first user with priority access to the allocated computing nodes during a specified period of time;
determining a group including at least one computing node of the program execution service to satisfy a request to execute a program for a second user, the at least one computing node of the determined group including one of the allocated computing nodes;
initiating execution of the program of the second user on the at least one computing node of the determined group; and
after receiving an indication to execute one or more programs of the first user, determining to terminate execution of the program of the second user on the included one allocated computing node;

terminating execution of the program of the second user on the included one allocated computing node; and making the included one allocated computing node to be available to execute the one or more programs of the first user.

28. The non-transitory computer-readable medium of claim 27 wherein the received indication to execute the one or more programs of the first user of the first group is based on a request from the first user to execute an indicated program on the allocated computing nodes, and wherein the method further comprises, after the terminating of the execution of the program of the second user on the one allocated computing node, executing the indicated program of the first user on the included one allocated computing node.

29. The non-transitory computer-readable medium of claim 27 wherein the priority access of the first user to the allocated computing nodes is dedicated access such that a request by the first user to execute a program on the allocated computing nodes during the specified period of time is guaranteed to be satisfied, wherein the included one allocated computing node is not executing a program for the first user at a time of the determining of the group of one or more computing nodes, and wherein the execution of the program of the second user on the one or more computing nodes of the determined group is performed in a non-guaranteed manner such that the execution of the program of the second user is allowed to be terminated at any time.

30. The non-transitory computer-readable medium of claim 27 wherein the first user is part of a first group of multiple users to whom multiple of a plurality of computing nodes of the program execution service are allocated for priority access, and wherein the method further comprises:

receiving multiple other requests from multiple other users of the program execution service, the other users being distinct from the users of the first group and from the second user, each of the other requests including a request to execute a respective program of a respective other user during at least some of the specified period of time;

determining a subgroup of the multiple other requests to execute on computing nodes of the program execution service, the determining of which of the multiple other requests to include in the subgroup being based at least part on a determined priority of each of the other requests, such that each request of the subgroup is determined to be of higher priority than other requests that are not in the subgroup; and for each of the requests of the subgroup, initiating execution of the respective program of the request on at least one of the multiple allocated computing nodes that is not currently executing programs on behalf of the users of the first group.

31. The non-transitory computer-readable medium of claim 27 wherein the computer-readable medium is a memory of the configured computing system that stores the contents, and wherein the contents are instructions that when executed program the configured computing system to perform the method.

* * * * *